US005815421A

United States Patent [19]
Dulong et al.

[11] Patent Number: 5,815,421
[45] Date of Patent: *Sep. 29, 1998

[54] METHOD FOR TRANSPOSING A TWO-DIMENSIONAL ARRAY

[75] Inventors: Carole Dulong, Saratogo, Calif.; Alexander D. Peleg, Carmelia, Israel; Larry M. Mennemeier, Boulder Creek, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 573,631

[22] Filed: Dec. 18, 1995

[51] Int. Cl.[6] .................................................... G06F 17/10
[52] U.S. Cl. ................................ 364/736.03; 364/736.01
[58] Field of Search .............................. 364/514 R, 736, 364/571.02, 725.01, 725.03, 736.01, 736.07, 748.01, 748.2, 754.01; 370/19; 382/205, 232, 233; 395/561, 562, 567, 564

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,139,899 | 2/1979 | Tulpule et al. | 364/900 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,168,571 | 12/1992 | Hoover et al. | 395/800 |
| 5,187,679 | 2/1993 | Vassiliadis | 364/786 |
| 5,193,167 | 3/1993 | Sites et al. | 395/425 |
| 5,268,995 | 12/1993 | Diefendorff et al. | 395/122 |
| 5,327,543 | 7/1994 | Miura et al. | 395/375 |
| 5,335,321 | 8/1994 | Hamey et al. | 395/162 |
| 5,390,135 | 2/1995 | Lee et al. | 364/749 |
| 5,408,670 | 4/1995 | Davies | 395/800 |
| 5,423,010 | 6/1995 | Mizukami | 395/375 |
| 5,465,374 | 11/1995 | Dinkjian et al. | 395/800 |
| 5,487,159 | 1/1996 | Byers et al. | 395/375 |
| 5,499,376 | 3/1996 | King et al. | 395/800 |
| 5,541,865 | 7/1996 | Ashkenazi | 364/715.09 |
| 5,598,514 | 1/1997 | Purcell et al. | 395/118 |
| 5,630,174 | 5/1997 | Stone, III et al. | 395/883 |
| 5,664,218 | 9/1997 | Kim et al. | 395/821 |
| 5,757,432 | 5/1998 | Dulong et al. | 348/384 |

OTHER PUBLICATIONS

Mathews, Numerical Methods, pp. 148–157, 1992.
Dow, "Transposing A Matrix On a Vector Computer", 1995.
Wang, "Method for Transposing Large Rectangular Matrices", 1982.
Zein, "Transposing a Matrix Without Incurring Additional Storage", 1992.
International Search Report for PCT/US96/20439, dated Mar. 19, 1997.

(List continued on next page.)

*Primary Examiner*—Emanuel T. Voeltz
*Assistant Examiner*—Patrick Assouad
*Attorney, Agent, or Firm*—Blakely, Sokoloff, Taylor & Zafman

[57] ABSTRACT

A method of transposing an array. An array of n rows, each row comprising a plurality of data elements, undergoes a transposition. First, data elements from a first row are interleaved with data elements from a second row to generate a first result. Also, data elements from a third row are interleaved with data elements from a fourth row to generate a second result. Then, data elements from the first result are interleaved with data elements from the second result to generate a third result.

37 Claims, 13 Drawing Sheets

OTHER PUBLICATIONS

International Publication No.: WO 96/17291 dated Jun. 6, 1996, of International Application No.: PCT/US95/15713.

J. Shipnes, *Graphics Processing with the 88110 RISC Microporcessor,* IEEE (1992), pp. 169–174.

*MC88110 Second Generation RISC Microprocessor User's Manual,* Motorola Inc. (1991).

*Errata to MC88110 Second Generation RISC Microprocessor User's Manual,* Motorola Inc. (1992), pp. 1–11.

*MC88110 Programmer's Reference Guide,* Motorola Inc. (1992), pp. 1–4.

i860™*Microprocessor Family Programmer's Reference Manual,* Intel Corporation (1992), Ch. 1, 3, 8, 12.

R. B. Lee, *Accelerating Multimedia With Enhanced Microprocessors,* IEEE Micro (Apr. 1995), pp. 22–32.

*TMS320C2x User's Guide,* Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video,* Microprocessor Report (Jan. 1994), pp. 16, 17.

SPARC Technology Business, *UltraSPARC Multimedia Capabilities On–Chip Support for Real–Time Video and Advanced Graphics,* Sun Microsystems (Sep. 1994).

Y. Kawakami et al., *LSI Applications: A single–Chip Digital Signal Processor for Voiceband Applications,* Solid State Circuits Conference, Digest of Technical Papers; IEEE International (1980).

B. Case, *Philips Hopes to Displace DSPs wtih VLIW,* Microprocessor Report (Dec. 94), pp. 12–15.

L. Gwennap, *UltraSparc Adds Multimedia Instructions,* Microprocessor Report (Dec. 94), pp. 16–18.

N. Margulis, *i860 Microprocessor Architecture,* McGraw Hill, Inc. (1990) Ch. 6, 7, 8, 10, 11.

*Pentium Processor User's Manual, Volume 3: Architecture and Programming Manual,* Intel Corporation (1993), Ch. 1, 3, 4, 6, 8, and 18.

$R_0 \sim$ | $d_0$ | $c_0$ | $b_0$ | $a_0$ |
$R_1 \sim$ | $d_1$ | $c_1$ | $b_1$ | $a_1$ |
$R_2 \sim$ | $d_2$ | $c_2$ | $b_2$ | $a_2$ |
$R_3 \sim$ | $d_3$ | $c_3$ | $b_3$ | $a_3$ |  } 500

$t_0$ = Unpack LW $R_0 R_1$ = | $b_1$ | $b_0$ | $a_1$ | $a_0$ |

$t_1$ = Unpack LW $R_2 R_3$ = | $b_3$ | $b_2$ | $a_3$ | $a_2$ |

$t_2$ = Unpack HW $R_0 R_1$ = | $d_1$ | $d_0$ | $c_1$ | $c_0$ |

$t_3$ = Unpack HW $R_2 R_3$ = | $d_3$ | $d_2$ | $c_3$ | $c_2$ |

$V_0$ = Unpack LD $t_0 t_1$ = | $a_3$ | $a_2$ | $a_1$ | $a_0$ |

$V_1$ = Unpack HD $t_0 t_1$ = | $b_3$ | $b_2$ | $b_1$ | $b_0$ |

$V_2$ = Unpack LD $t_2 t_3$ = | $c_3$ | $c_2$ | $c_1$ | $c_0$ |

$V_3$ = Unpack HD $t_2 t_3$ = | $d_3$ | $d_2$ | $d_1$ | $d_0$ |

$V_0 \sim$ | $a_3$ | $a_2$ | $a_1$ | $a_0$ |
$V_1 \sim$ | $b_3$ | $b_2$ | $b_1$ | $b_0$ |
$V_2 \sim$ | $c_3$ | $c_2$ | $c_1$ | $c_0$ |
$V_3 \sim$ | $d_3$ | $d_2$ | $d_1$ | $d_0$ |  } 501

Figure 5

$$R_0 \sim \begin{array}{|c|c|c|c|} \hline d_0 & c_0 & b_0 & a_0 \\ \hline \end{array}$$

| | $d_0$ | $c_0$ | $b_0$ | $a_0$ |
|---|---|---|---|---|
| $R_0 \sim$ | $d_0$ | $c_0$ | $b_0$ | $a_0$ |
| $R_1 \sim$ | $d_1$ | $c_1$ | $b_1$ | $a_1$ |
| $R_2 \sim$ | $d_2$ | $c_2$ | $b_2$ | $a_2$ |
| $R_3 \sim$ | $d_3$ | $c_3$ | $b_3$ | $a_3$ |

600

$t_0$ = Unpack LW  $R_0 R_2$ = | $b_2$ | $b_0$ | $a_2$ | $a_0$ |

$t_1$ = Unpack LW  $R_1 R_3$ = | $b_3$ | $b_1$ | $a_3$ | $a_1$ |

$t_2$ = Unpack HW  $R_0 R_2$ = | $d_2$ | $d_0$ | $c_2$ | $c_0$ |

$t_3$ = Unpack HW  $R_1 R_3$ = | $d_3$ | $d_1$ | $c_3$ | $c_1$ |

$V_0$ = Unpack LW  $t_0 t_1$ = | $a_3$ | $a_2$ | $a_1$ | $a_0$ |

$V_1$ = Unpack HW  $t_0 t_1$ = | $b_3$ | $b_2$ | $b_1$ | $b_0$ |

$V_2$ = Unpack LW  $t_2 t_3$ = | $c_3$ | $c_2$ | $c_1$ | $c_0$ |

$V_3$ = Unpack HW  $t_2 t_3$ = | $d_3$ | $d_2$ | $d_1$ | $d_0$ |

| | | | | |
|---|---|---|---|---|
| $V_0 \sim$ | $a_3$ | $a_2$ | $a_1$ | $a_0$ |
| $V_1 \sim$ | $b_3$ | $b_2$ | $b_1$ | $b_0$ |
| $V_2 \sim$ | $c_3$ | $c_2$ | $c_1$ | $c_0$ |
| $V_3 \sim$ | $d_3$ | $d_2$ | $d_1$ | $d_0$ |

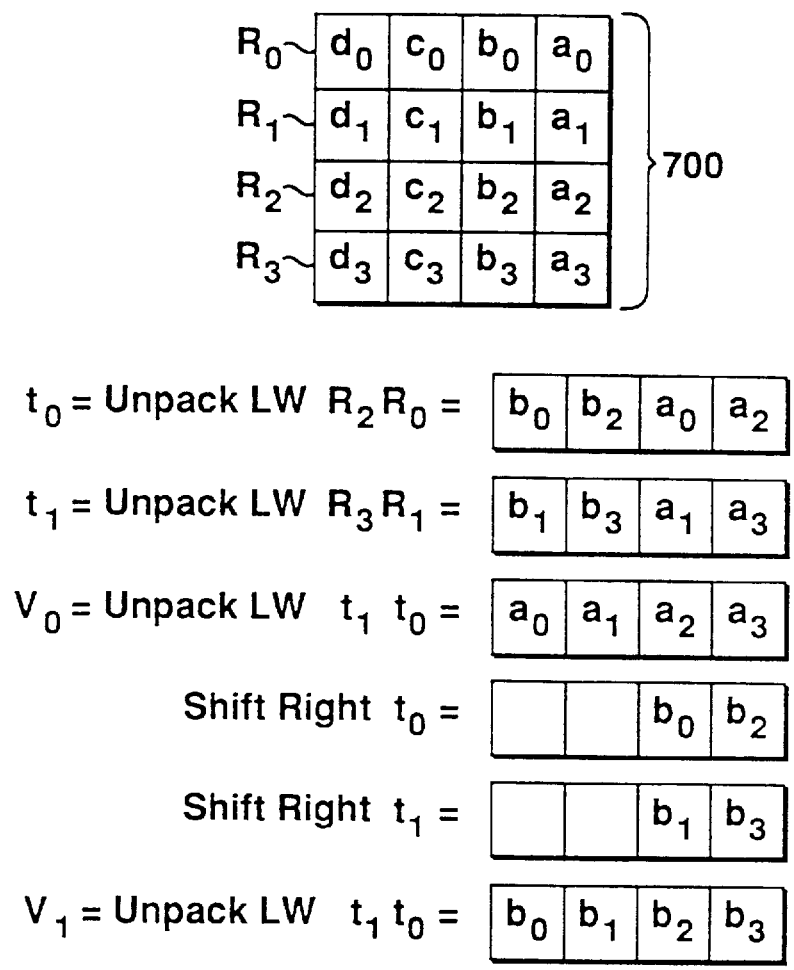
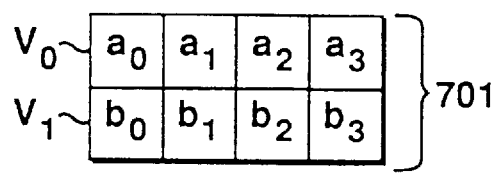
Figure 7

$$
\begin{array}{c|c|c|c|c|c|c|c|c|}
R_0 & h_0 & g_0 & f_0 & e_0 & d_0 & c_0 & b_0 & a_0 \\
R_1 & h_1 & g_1 & f_1 & e_1 & d_1 & c_1 & b_1 & a_1 \\
R_2 & h_2 & g_2 & f_2 & e_2 & d_2 & c_2 & b_2 & a_2 \\
R_3 & h_3 & g_3 & f_3 & e_3 & d_3 & c_3 & b_3 & a_3 \\
R_4 & h_4 & g_4 & f_4 & e_4 & d_4 & c_4 & b_4 & a_4 \\
R_5 & h_5 & g_5 & f_5 & e_5 & d_5 & c_5 & b_5 & a_5 \\
R_6 & h_6 & g_6 & f_6 & e_6 & d_6 & c_6 & b_6 & a_6 \\
R_7 & h_7 & g_7 & f_7 & e_7 & d_7 & c_7 & b_7 & a_7 \\
\end{array} \Big\} 800
$$

$t_0$ = Unpack LB $R_0 R_1$ = | $d_1$ | $d_0$ | $c_1$ | $c_0$ | $b_1$ | $b_0$ | $a_1$ | $a_0$ |

$t_1$ = Unpack LB $R_2 R_3$ = | $d_3$ | $d_2$ | $c_3$ | $c_2$ | $b_3$ | $b_2$ | $a_3$ | $a_2$ |

$t_2$ = Unpack LB $R_4 R_5$ = | $d_5$ | $d_4$ | $c_5$ | $c_4$ | $b_5$ | $b_4$ | $a_5$ | $a_4$ |

$t_3$ = Unpack LB $R_6 R_7$ = | $d_7$ | $d_6$ | $c_7$ | $c_6$ | $b_7$ | $b_6$ | $a_7$ | $a_6$ |

$t_4$ = Unpack HB $R_0 R_1$ = | $h_1$ | $h_0$ | $g_1$ | $g_0$ | $f_1$ | $f_0$ | $e_1$ | $e_0$ |

$t_5$ = Unpack HB $R_2 R_3$ = | $h_3$ | $h_2$ | $g_3$ | $g_2$ | $f_3$ | $f_2$ | $e_3$ | $e_2$ |

$t_6$ = Unpack HB $R_4 R_5$ = | $h_5$ | $h_4$ | $g_5$ | $g_4$ | $f_5$ | $f_4$ | $e_5$ | $e_4$ |

$t_7$ = Unpack HB $R_6 R_7$ = | $h_7$ | $h_6$ | $g_7$ | $g_6$ | $f_7$ | $f_6$ | $e_7$ | $e_6$ |

$u_0$ = Unpack LW $t_0 \ t_1$ = | $b_3$ | $b_2$ | $b_1$ | $b_0$ | $a_3$ | $a_2$ | $a_1$ | $a_0$ |

$u_1$ = Unpack LW $t_2 \ t_3$ = | $b_7$ | $b_6$ | $b_5$ | $b_4$ | $a_7$ | $a_6$ | $a_5$ | $a_4$ |

$u_2$ = Unpack HW $t_0 \ t_1$ = | $d_3$ | $d_2$ | $d_1$ | $d_0$ | $c_3$ | $c_2$ | $c_1$ | $c_0$ |

$u_3$ = Unpack HW $t_2 \ t_3$ = | $d_7$ | $d_6$ | $d_5$ | $d_4$ | $c_7$ | $c_6$ | $c_5$ | $c_4$ |

Figure 8A $u_4$ = Unpack LW  $t_4\ t_5$ = | $f_3$ | $f_2$ | $f_1$ | $f_0$ | $e_3$ | $e_2$ | $e_1$ | $e_0$ |

$u_5$ = Unpack LW  $t_6\ t_7$ = | $f_7$ | $f_6$ | $f_5$ | $f_4$ | $e_7$ | $e_6$ | $e_5$ | $e_4$ |

$u_6$ = Unpack HW  $t_4\ t_5$ = | $h_3$ | $h_2$ | $h_1$ | $h_0$ | $g_3$ | $g_2$ | $g_1$ | $g_0$ |

$u_7$ = Unpack HW  $t_6\ t_7$ = | $h_7$ | $h_6$ | $h_5$ | $h_4$ | $g_7$ | $g_6$ | $g_5$ | $g_4$ |

$V_0$ = Unpack LD  $u_0\ u_1$ = | $a_7$ | $a_6$ | $a_5$ | $a_4$ | $a_3$ | $a_2$ | $a_1$ | $a_0$ |

$V_1$ = Unpack HD  $u_0\ u_1$ = | $b_7$ | $b_6$ | $b_5$ | $b_4$ | $b_3$ | $b_2$ | $b_1$ | $b_0$ |

$V_2$ = Unpack LD  $u_2\ u_3$ = | $c_7$ | $c_6$ | $c_5$ | $c_4$ | $c_3$ | $c_2$ | $c_1$ | $c_0$ |

$V_3$ = Unpack HD  $u_2\ u_3$ = | $d_7$ | $d_6$ | $d_5$ | $d_4$ | $d_3$ | $d_2$ | $d_1$ | $d_0$ |

$V_4$ = Unpack LD  $u_4\ u_5$ = | $e_7$ | $e_6$ | $e_5$ | $e_4$ | $e_3$ | $e_2$ | $e_1$ | $e_0$ |

$V_5$ = Unpack HD  $u_4\ u_5$ = | $f_7$ | $f_6$ | $f_5$ | $f_4$ | $f_3$ | $f_2$ | $f_1$ | $f_0$ |

$V_6$ = Unpack LD  $u_6\ u_7$ = | $g_7$ | $g_6$ | $g_5$ | $g_4$ | $g_3$ | $g_2$ | $g_1$ | $g_0$ |

$V_7$ = Unpack HD  $u_6\ u_7$ = | $h_7$ | $h_6$ | $h_5$ | $h_4$ | $h_3$ | $h_2$ | $h_1$ | $h_0$ |

| | | | | | | | | |
|---|---|---|---|---|---|---|---|---|
| $V_0$ | $a_7$ | $a_6$ | $a_5$ | $a_4$ | $a_3$ | $a_2$ | $a_1$ | $a_0$ |
| $V_1$ | $b_7$ | $b_6$ | $b_5$ | $b_4$ | $b_3$ | $b_2$ | $b_1$ | $b_0$ |
| $V_2$ | $c_7$ | $c_6$ | $c_5$ | $c_4$ | $c_3$ | $c_2$ | $c_1$ | $c_0$ |
| $V_3$ | $d_7$ | $d_6$ | $d_5$ | $d_4$ | $d_3$ | $d_2$ | $d_1$ | $d_0$ |
| $V_4$ | $e_7$ | $e_6$ | $e_5$ | $e_4$ | $e_3$ | $e_2$ | $e_1$ | $e_0$ |
| $V_5$ | $f_7$ | $f_6$ | $f_5$ | $f_4$ | $f_3$ | $f_2$ | $f_1$ | $f_0$ |
| $V_6$ | $g_7$ | $g_6$ | $g_5$ | $g_4$ | $g_3$ | $g_2$ | $g_1$ | $g_0$ |
| $V_7$ | $h_7$ | $h_6$ | $h_5$ | $h_4$ | $h_3$ | $h_2$ | $h_1$ | $h_0$ |

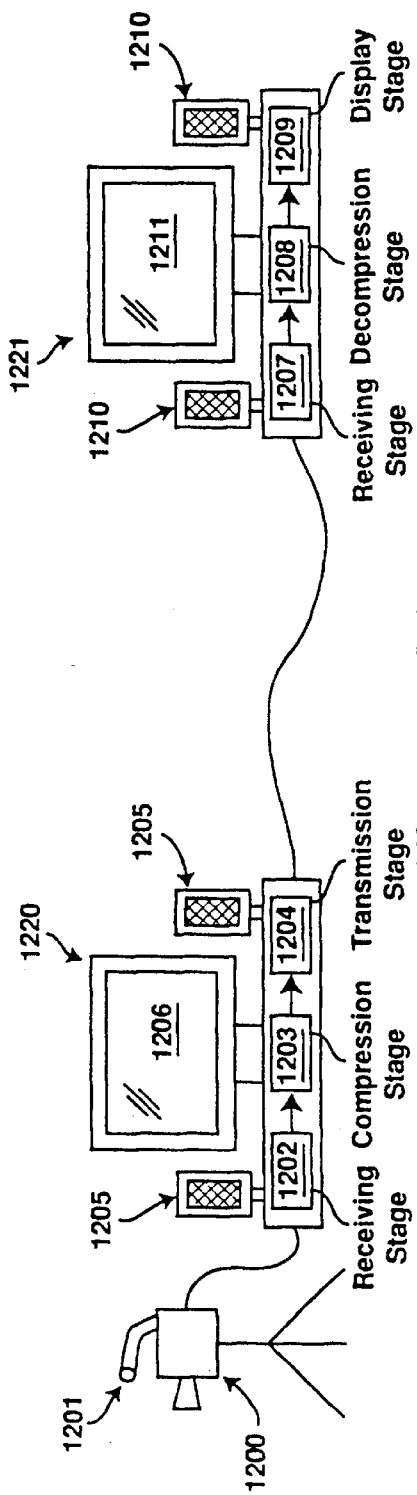
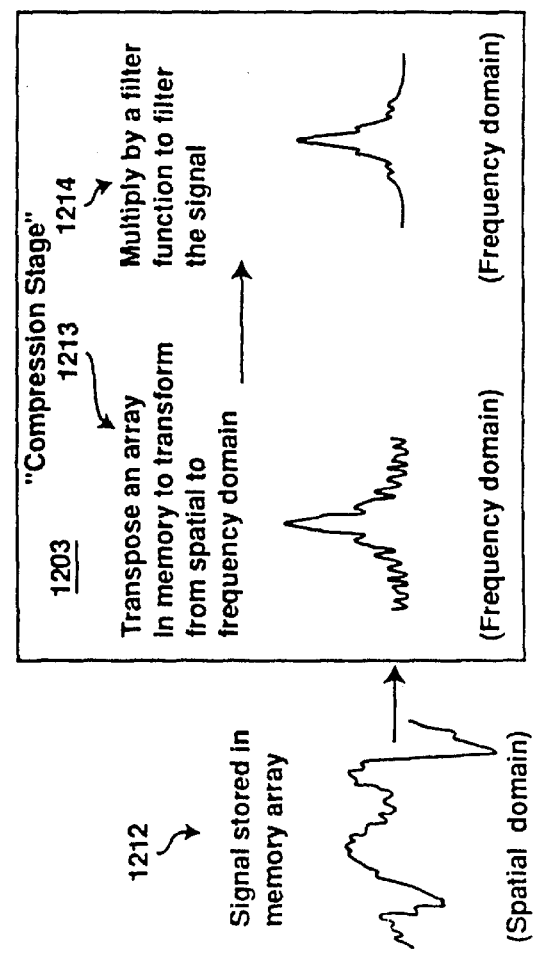
Figure 12A
Figure 12B

METHOD FOR TRANSPOSING A TWO-DIMENSIONAL ARRAY

FIELD OF THE INVENTION

The present invention relates to the field of computer systems and more particularly to a method of using a single instruction multiple data (SIMD) computer to transpose a two-dimensional array.

BACKGROUND OF THE INVENTION

A two dimensional array of data is a matrix of rows and columns wherein the location of each data element in the array can be uniquely identified by its row and column. For example, a basic spreadsheet computer program which tracks the employees of a particular company represents an array. Each row of the spreadsheet might be identified by a different employee name while each column might contain information such as salary, employee number, and other employment information for each employee. To transpose an array means to translate the layout of the array such that rows of the original array become columns of the transposed array while columns of the original array become rows of the transposed array. In the spreadsheet example, each column of the transposed array is identified by an employee name while each row contains the employment information.

One advantage to transposing an array is that the data in the array can be more easily manipulated. In the spreadsheet example, suppose only row-wise computations were possible, and further assume that every employee's salary is to be raised by 5%. To update the array, one would need to step through each row and update the data in the salary column one row at a time, which could be quite time consuming. Alternatively, the array is first transposed so that the column of salaries in the original array becomes a row of salaries in the transposed array. The entire row of salaries is then updated in a single step of instructing the computer to perform a row-wise computation, raising all salaries by 5%. The transposed array is then transposed back to its original form, its salary column having been updated in a single step.

As a more practical example, data is generally organized in rows in a computer system memory, wherein each row is a memory register identified by a particular memory address. In some advanced computing systems, each register contains multiple data elements. Each of these data elements is essentially contained within a "column" of data, the column constituting similarly situated data elements from a plurality of rows. For example, a 4×4 array of pixels from a video image is stored in computer system memory in four memory registers (four "rows"), each register comprising four contiguous data elements (four "columns"). The value of each data element in the 4×4 array of data elements in computer system memory corresponds to the color of its associated pixel of the 4×4 array of pixels.

Conventional computer operations manipulate data in memory registers preferably in a row-wise fashion, rather than column-wise, because each row is identifiable by a unique register address which can be easily accessed from contiguous memory registers. However, often it is desirable to execute the same instruction over several data elements in a column, the column cutting across several rows of register addresses. For the 4×4 array of data elements described above, executing the same instruction on each data element in a single column means executing the same instruction 4 times, once for each of the 4 rows. To avoid having to execute the same instruction multiple times in a serial manner, the array is transposed, so columns become rows, and the instruction can then be executed once across the row of data in a parallel manner.

Because a 4×4 array comprises 16 data elements, transposing the array requires 40 operations. First, each of the 16 data elements are individually loaded into each of 16 separate, temporary registers, requiring 16 load operations. Next, the twelve data elements which are to occupy locations other than the first location in each memory register of the transposed array must be shifted to the proper position in its temporary register, requiring 12 shift operations. Finally, four sets of the 16 temporary registers are combined into the final four memory register rows of the transposed 4×4 array, requiring 12 logical OR operations. Once the 4×4 array has been transposed, an instruction can be executed across an entire row of the transposed array, in parallel, to create a modified row in a single operation. When the array is transposed back to its original form, the modified row becomes the desired, modified column of the array.

In more advanced video processing applications, array transposition is useful for implementing computationally intensive functions such as fast Fourier transforms and discrete cosine transforms. These transforms use array transposition in filter and compression techniques for digital signal processing applications. The ability to perform rapid array transposition in these and other multimedia applications is an important element to increasing the speed of these applications by, for example, allowing columns of data to be processed in parallel as rows of their associated, transposed arrays.

In many cases, the time it takes to transpose an array, execute the desired operations on the rows of the transposed array, and re-transpose the array back to its original form is greater than the time it takes to simply execute the desired operations a plurality of times, in a serial manner, on each row of the array "in place". In such cases, any advantages which would be gained by parallel processing of the data elements in a row of the transposed array are lost. Therefore, what is desired is a method for speeding the transposition of an array.

SUMMARY OF THE INVENTION

A method of transposing an array is described. An array of n rows, each row comprising a plurality of data elements, undergoes a transposition. First, data elements from a first row are interleaved with data elements from a second row to generate a first result. Also, data elements from a third row are interleaved with data elements from a fourth row to generate a second result. Then, data elements from the first result are interleaved with data elements from the second result to generate a third result. Therefore, the third result contains data elements from the first, second, third, and fourth rows.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which:

FIG. 5 shows a method for transposing an array in accordance with one embodiment of the present invention.

FIG. 6 shows a method for transposing an array in accordance with another embodiment of the present invention.

FIG. 7 shows a method for transposing an array in accordance with another embodiment of the present invention.

FIG. 8A shows a first portion of a method for transposing an array in accordance with another embodiment of the present invention.

FIG. 8B shows a second portion of a method for transposing an array in accordance with another embodiment of the present invention.

FIG. 12A shows an application of array transposition in accordance with an embodiment of the present invention.

FIG. 12B shows some steps implemented in FIG. 12A in accordance with an embodiment of the present invention.

DETAILED DESCRIPTION

A method of transposing a two-dimensional array is described using a series of unpack operations on packed data sets. For one embodiment of the present invention, packed data stored in a memory register constitutes a "row" of data. Each data element packed into the data set constitutes a "column". In this manner, packed data elements stored in memory registers having consecutive addresses constitute an array, or matrix, of data. In accordance with one embodiment of the present invention, packed data stored in a first memory register is unpacked with packed data stored in another memory register. By unpacking the data, the data elements of the two packed data sets are interleaved with each other. Additional unpacking of packed data sets ultimately results in transposition of the associated array of data.

A method for transposing a two-dimensional array is described in more detail below along with its application in a computer system.

Figure 1:
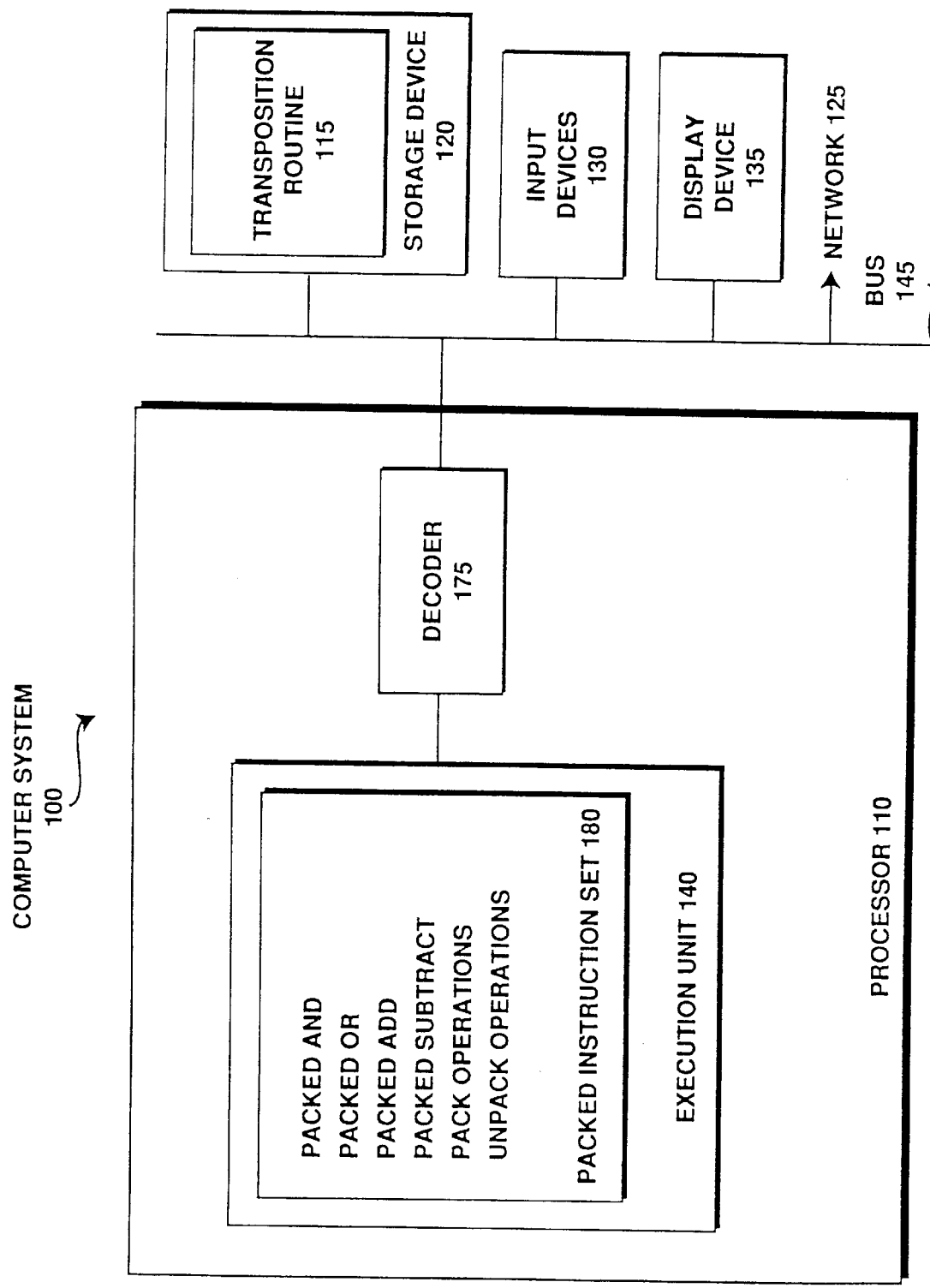
FIG. 1 shows a computer system in accordance with one embodiment of the present invention.

FIG. 1 shows a block diagram illustrating an exemplary computer system 100 according to one embodiment of the invention. The exemplary computer system 100 includes a processor 110, a storage device 120, and a bus 145. The processor 110 is coupled to storage device 120 by bus 145. Bus 145 represents one or more busses and bridges (or bus controllers) which comport with one or more bus protocols. A number of input devices 130, and a display device 135, are also coupled to the bus. A network 125 may also be coupled to bus 145.

Processor 110 represents a central processing unit of any type of architecture, including, for example, complex instruction set computing (CISC), reduced instruction set computing (RISC), very large instruction word (VLIW), or a hybrid architecture. Note that processor 110 may be implemented on one or more semiconductor chips. Processor 110 includes an execution unit 140 and a decoder 175 along with some additional, conventional circuitry. (The additional circuitry has not been shown to avoid obscuring the present invention.) While this embodiment is described in relation to a single processor computer system, the invention can be implemented in a multi-processor computer system as well. In addition, while several embodiments are described below in relation to a 64-bit computer system, the invention is not limited to a 64-bit computer system.

Storage device 120 represents the memory of the computer system and includes one or more mechanisms for storing data. For example, the storage device may include machine-readable memory mediums such as, for example, read only memory (ROM), random access memory (RAM) (e.g. DRAM and cache memory (note that cache memory may actually be contained within the processor itself)), magnetic storage mediums (e.g. hard and floppy disks), optical storage mediums such as compact disk ROM (CD-ROM), and other non-volatile solid state mediums such as flash memory devices. Storage device 120 has stored therein a transposition routine 115 for execution on processor 110 to control array transposition in accordance with an embodiment of the present invention. In addition, memory registers within storage device 120 contain data used by the transposition routine 115, as described in more detail below. Storage device 120 also contains additional software, the details of which are not necessary for an understanding of the present invention.

Input devices 130 represent any of a number of devices capable of generating signals which are processed by the computer system. For example, input devices 130 may include a keyboard and a mouse for entering, selecting, and modifying data in the computer system. In addition, input devices 130 may include multimedia input devices, including video and/or audio input devices. Video includes both individual, still-motion images as well as multiple images in a moving picture format. A multimedia input device includes a video camera or other image capturing device, a video cassete recorder (VCR), another computer system which outputs a video or audio signal, a CD-ROM or other optical storage device, or a microphone. Display device 135 includes a cathode ray tube (CRT), a liquid crystal display (LCD), a hard-copy printout, or other image generating device. For an alternate embodiment in which audio signals are output by the computer system, speakers are coupled to the bus for playback.

Many multimedia applications, as well as other advanced software applications, process huge amounts of data comprising relatively small, individual data elements that may be, for example, only 16 bits wide. These applications are implemented on computer systems which are designed to accommodate, for example, 64 bit wide data. Processing 16 bit wide data through 64 bit wide data buses and registers in the computer system effectively wastes 48 bits worth of space in those buses and registers. A data format called "packed" data exploits this otherwise wasted space. A packed data format "packs" multiple, discrete data elements into one larger data representation, or data set. For example, data in a 64 bit register, which generally represents only a single, scalar 64 bit value, may instead comprise four 16 bit packed data elements, each representing a separate value. In other words, four 16 bit data elements (or a different number of smaller or larger elements) are "packed" into one 64 bit register.

To effectively use packed data formats, a processor used in an embodiment of the present invention supports operations which operate on packed data formats. Because it is more efficient to manipulate several discrete data elements within a data set at the same time, rather than individually, advanced multimedia applications can make use of packed data instructions which cause a processor to operate in parallel on the discrete data elements within a packed data set. Packed data instructions are also known as Single Instruction Multiple Data (SIMD) instructions. By enabling the parallel processing of multiple data elements packed into a single data set using SIMD instructions, the speed with which many software applications are executed is substantially increased.

Decoder 175 is used for decoding instructions received by processor 110 into control signals and/or microcode entry points. In response to these control signals and/or microcode entry points, the execution unit performs the appropriate operations. Decoder 175 may be implemented using any number of different mechanisms including, for example, a look-up table, a hardware implementation, or a programmable logic array.

Execution unit 140 operates on packed data according to the instructions received by processor 110, and decoded by decoder 175, that are included in packed instruction set 180 of the processor. Execution unit 140 also operates on scalar data according to instructions implemented in general-purpose processors. Including packed instruction set 180 into the processor, along with the associated circuitry in decoder 175 and execution unit 140 for decoding and executing the instructions, respectively, provides a vast array of opportunities to improve and to create new and more efficient multimedia applications. For one embodiment, the packed instruction set 180 includes instructions for executing the following operations: a packed AND, a packed OR, a packed ADD, a packed SUBTRACT, pack operations, and unpack operations. Alternative embodiments can implement more, less, or different packed data instructions and still utilize the teachings of the present invention. For another embodiment, these packed data instructions are those described in "A Set of Instructions for Operating on Packed Data," filed on Aug. 31, 1995, Ser. No. 08/521,360.

In one embodiment of the invention, execution unit 140 operates on data in several different packed data formats. For example, in one embodiment computer system 100 manipulates 64-bit data groups. In this embodiment, packed data can be in one of three formats: a "packed byte" format (one byte=8 bits), a "packed word" format (one word=16 bits), or a "packed doubleword" format (one doubleword=32 bits). Packed data in a packed byte format includes eight separate 8 bit data elements; packed data in a packed word format includes four separate 16 bit data elements; and packed data in a packed doubleword format includes two separate 32 bit data elements. While some examples of unpack operations are discussed below with reference to one packed data format, the operations apply similarly to any of the packed data formats of the invention.

Figure 2:
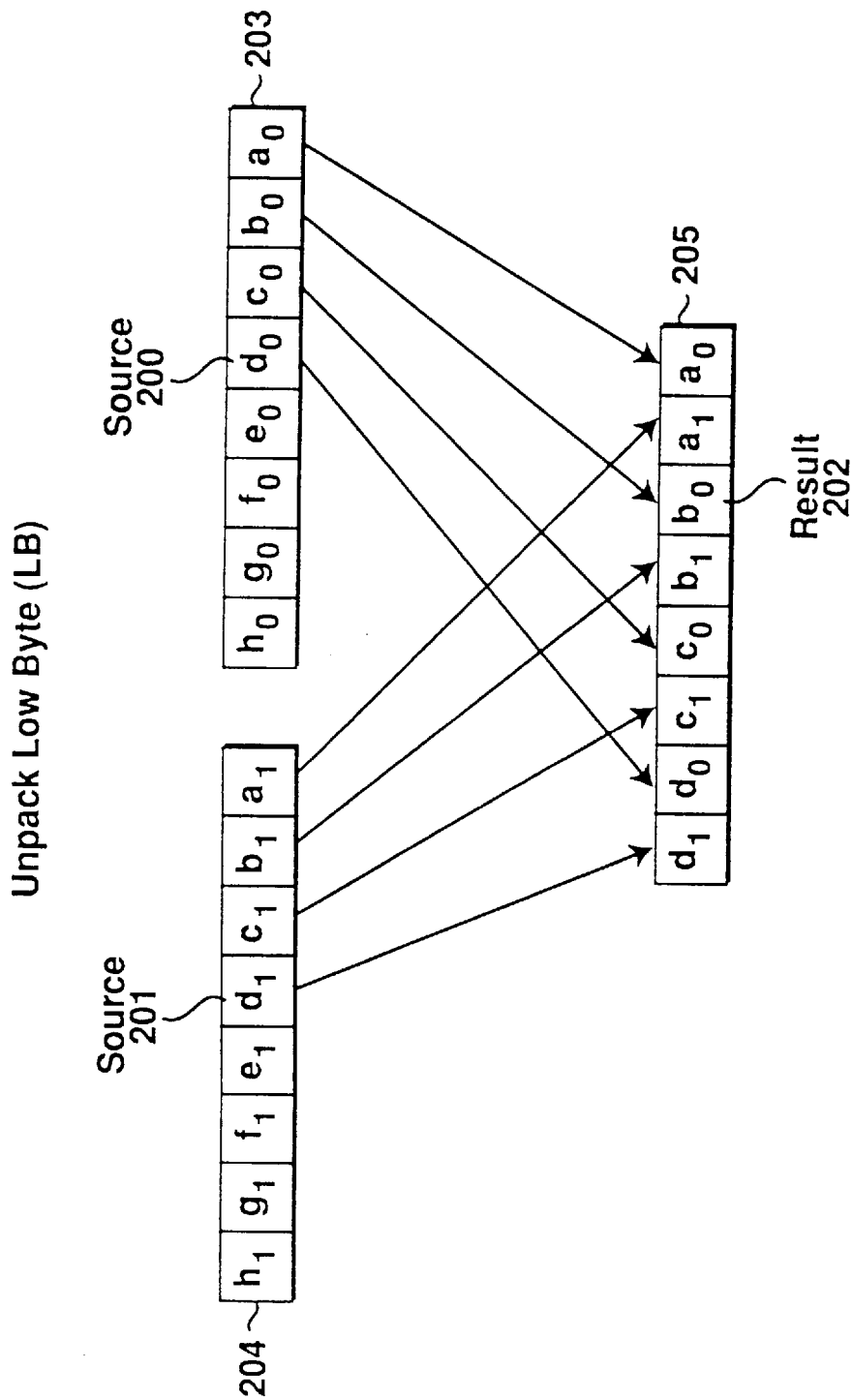
FIG. 2 shows one embodiment of an unpack operation.
Figure 3A:
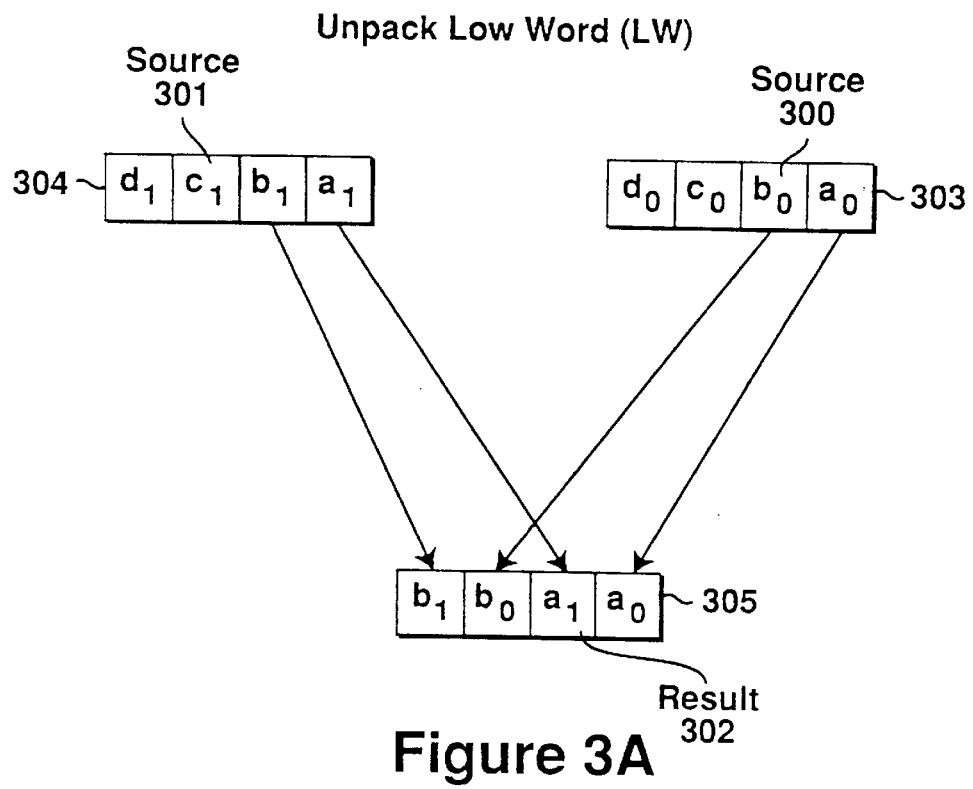
FIG. 3A shows another embodiment of an unpack operation.
Figure 3B:
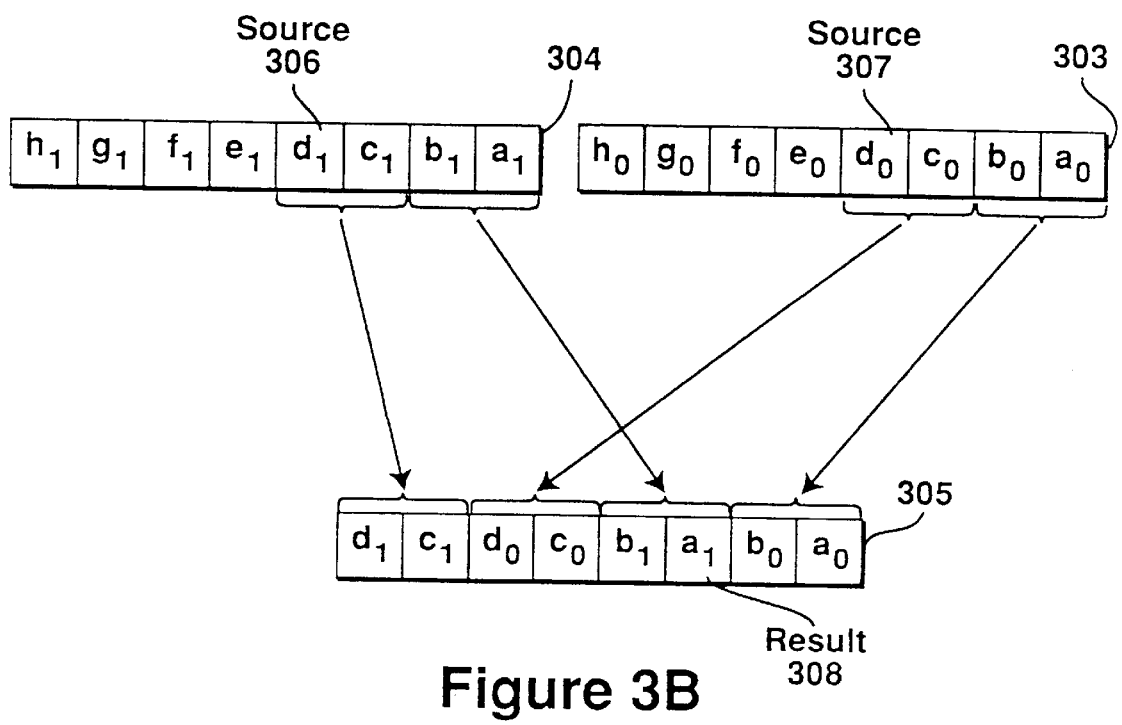
FIG. 3B shows another embodiment of an unpack operation.
Figure 4:
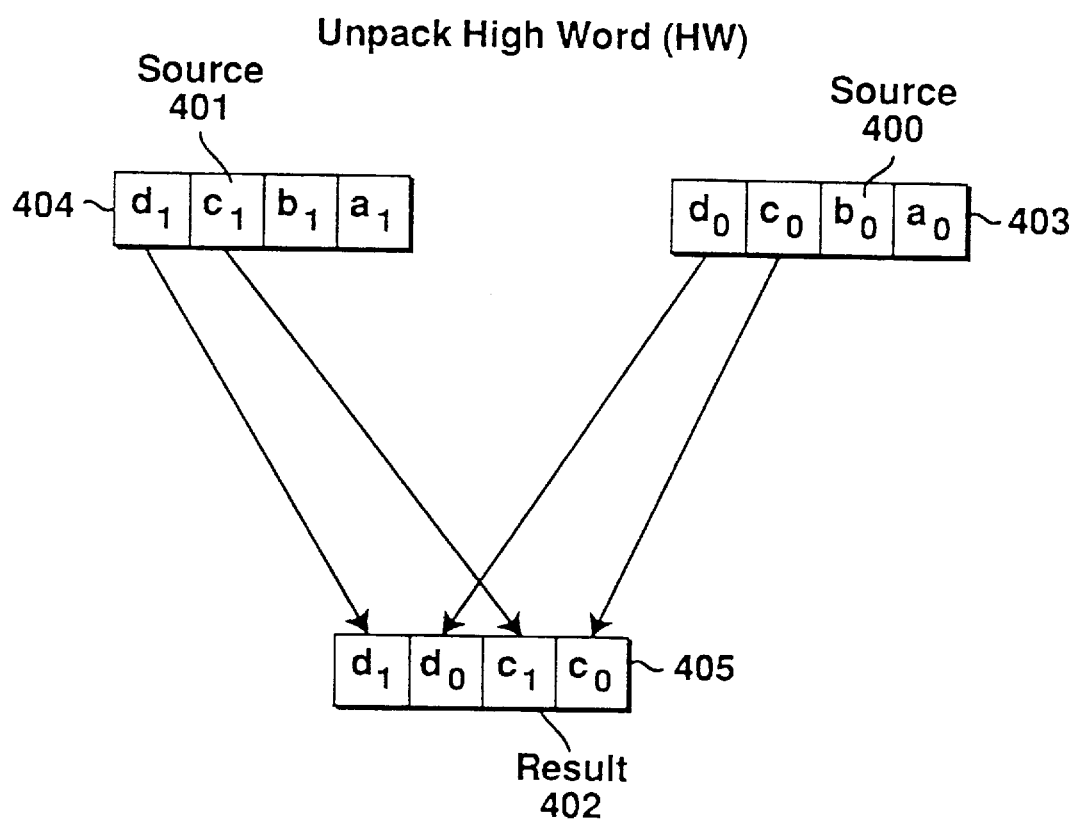
FIG. 4 shows another embodiment of an unpack operation.

Referring now to FIGS. 2–4, embodiments of the unpack instruction of packed instruction set 180 are described in more detail. An unpack operation manipulates data elements by interleaving data from a first source with data from a second source to generate a result. For one embodiment, the first source, second source, and result are given distinct address locations within the computer system memory. For another embodiment, the result is stored in the same register as one of the source registers. It is to be noted that because each operation is performed by a corresponding instruction of the same name, the use of the words "operation" and "instruction" have been used interchangeably herein.

While generally low-order data elements reside in the lower half or upper half of a register (depending on the perspective and convention) and high-order data elements reside in the upper half or lower half of a register (depending on the perspective and convention), the terms low-order and high-order data elements are used herein to indicate relative data element locations within a register, rather than absolute selections of data elements. For example, low-order or high-order data elements may constitute more than or less than half the register in which they are stored.

An example of an unpack operation is shown in FIG. 2. For one embodiment, the unpack operation performs an unpack of the low-order data elements of Source 201, within register 204, and Source 200, within register 203, to generate Result 202, within register 205. Thus, data element a(0) of Source 200, which resides in the lowest-order location within register 203, is stored in the lowest-order location of result register 205. Data element a(1) of Source 201, which resides in the lowest-order location within register 204, is stored in the second lowest-order location of result register 205. Data element b(0) of Source 200, which resides in the second lowest-order location within register 203, is stored in the third lowest-order location of result register 205. Data element b(1) of Source 201, which resides in the second lowest-order location within register 204, is stored in the fourth lowest-order location of result register 205.

Interleaving of Source 201 and Source 200 continues in this manner until register 205 is filled. Once filled, Result 202 ultimately comprises the packed data set d(1)d(0)c(1)c(0)-b(1)b(0)a(1)a(0). The high-order data elements of both Source 200 and Source 201 are ignored.

Registers 203, 204, and 205 of FIG. 2 are each 64 bits wide, and Source 200, Source 201, and Result 202 are 64 bit packed data sets in packed byte format, meaning each data element a(0), b(0), c(0) . . . g(0), h(0), a(1), b(1), c(1) . . . g(1), h(1) is 8 bits wide. Because the unpack operation of FIG. 2 unpacks the low-order, 8 bit wide byte data elements of Source 200 and Source 201, the unpack operation is referred to as an "Unpack Low Byte" or "Unpack LB" operation. In accordance with one embodiment of the present invention, the entire unpack operation is performed in a single step, using a single instruction.

An example of another unpack operation is shown in FIG. 3A. For one embodiment, the unpack operation performs an unpack of the low-order data elements of Source 300, within register 303, and Source 301, within register 304, to generate Result 302, within register 305. Thus, data element a(0) of Source 300, which resides in the lowest-order location within register 303, is stored in the lowest-order location of result register 305. Data element a(1) of Source 301, which resides in the lowest-order location within register 304, is stored in the second lowest-order location of result register 305. Data element b(0) of Source 300, which resides in the second lowest-order location within register 303, is stored in the second highest-order location of result register 305. Data element b(1) of Source 301, which resides in the second lowest-order location within register 304, is stored in the highest-order location of result register 305.

Interleaving of the low-order data elements of Source 301 and Source 300 generates Result 302 comprising the packed data set b(1)b(0)a(1)a(0). The high-order data elements of both Source 300 and Source 301 are ignored.

Registers 303, 304, and 305 of FIG. 3A are each 64 bits wide, and Source 300, Source 301, and Result 302 are 64 bit packed data sets in packed word format, meaning each data element a(0), b(0), c(0), d(0), a(1), b(1), c(1), and d(1) is 16 bits wide. Because the unpack operation of FIG. 3A unpacks the low-order, 16 bit wide word data elements of Source 300 and Source 301, the unpack operation is referred to as an "Unpack Low Word" or "Unpack LW" operation. In accordance with one embodiment of the present invention, the entire unpack operation is performed in a single step, which may be executed in one clock cycle.

For another embodiment, an unpack word operation, such as that shown in FIG. 3A, is performed on packed byte data sets, treating contiguous byte pairs (constituting a word) within the data sets as single data elements to be unpacked. Accordingly, for an alternate embodiment, an unpack operation is performed on packed data sets, interleaving data elements from a first packed data set with data elements from a second packed data set, wherein each data element itself comprises multiple, smaller data elements.

For example, see FIG. 3B in which an Unpack LW operation interleaves 16 bit data elements from two packed data sets, wherein each 16 bit data element comprises two 8 bit data elements. The unpack operation performs a 16 bit unpack word of the low-order data elements of Source 307, within register 303, and Source 306, within register 304, to generate Result 308, within register 305. However, in this embodiment, registers 303, 304, and 305 each contain packed byte data sets rather than the packed word data sets of FIG. 3A. Thus, data elements a(0) and b(0) of Source 307, which reside in the lowest-order 16 bit location within register 303, are stored in the lowest-order 16 bit location of result register 305. Data elements a(1) and b(1) of Source 306, which reside in the lowest-order 16 bit location within register 304, are stored in the second lowest-order 16 bit location of result register 305. Data elements c(0) and d(0) of Source 307, which reside in the second lowest-order 16 bit location within register 303, is stored in the second highest-order 16 bit location of result register 305. Data elements c(1) and d(1) of Source 306, which reside in the second lowest-order 16 bit location within register 304, is stored in the highest-order 16 bit location of result register 305.

Interleaving of the low-order 16 bit words of Source 307 and Source 306, wherein each word comprises two packed byte data elements, generates Result 308 comprising the packed data set d(1)c(1)d(0)c(0)b(1)a(1)b(0)a(0). The high-order data elements of both Source 307 and Source 306 are ignored.

As another example, an unpack operation interleaves 32 bit data elements from packed doubleword, packed word, or packed byte data sets, wherein each of the interleaved data elements comprises a single 32 bit data element (one double word), two 16 bit data elements (two words), or four 8 bit data elements (four bytes), respectively. This embodiment has been found useful in certain transposition applications which are described in more detail below.

Also, for another embodiment of the present invention, the size of the source and result data sets is 32 bits, 128 bits, or other width which is larger than the width of the data elements contained therein. For example, a packed data set in accordance with one embodiment of the present invention is 128 bits wide and comprises 16 bytes, 8 words, 4 doublewords, or 2 quad words as discrete data elements. In addition, for other embodiments of the present invention, the unpack operation unpacks data elements which may be less than a byte in size, such as, for example, 4 bit data elements, or greater than a word in size, such as, for example, doubleword or quad word data elements. Note that the data elements unpacked by the unpack operation in accordance with an embodiment of the present invention are equal to or greater than the size of the original data elements packed into the data set.

An example of another unpack operation is shown in FIG. 4. For one embodiment, the unpack operation performs an unpack of the high-order data elements of Source 401, within register 404, and Source 400, within register 403, to generate Result 402, within register 405. Thus, data element c(0) of Source 400, which resides in the second highest-order location within register 403, is stored in the lowest-order location of result register 405. Data element c(1) of Source 401, which resides in the second highest-order location within register 404, is stored in the second lowest-order location of result register 405. Data element d(0) of Source 400, which resides in the highest-order location within register 403, is stored in the second highest-order location of result register 405. Data element d(1) of Source 401, which resides in the highest-order location within register 404, is stored in the highest-order location of result register 405.

Interleaving of the high-order data elements of Source 401 and Source 400 generates Result 402 comprising the packed data set d(1)d(0)c(1)c(0). The low-order data elements of both Source 400 and Source 401 are ignored.

Registers 403, 404, and 405 of FIG. 4 are each 64 bits wide, and Source 400, Source 401, and Result 402 are 64 bit packed data sets in packed word format, meaning each data element a(0), b(0), c(0), d(0), a(1), b(1), c(1), and d(1) is 16 bits wide. Because the unpack operation of FIG. 4 unpacks the high-order, 16 bit wide word data elements of Source 400 and Source 401, the unpack operation is referred to as an "Unpack High Word" or "Unpack HW" operation. In accordance with one embodiment of the present invention, the entire unpack operation is performed in a single step (e.g. one clock cycle).

FIG. 5 shows a method for transposing an array in accordance with one embodiment of the present invention. Array 500 is a 4×4 matrix comprising data sets R(0), R(1), R(2), and R(3) as rows of the array, each row containing four data elements a, b, c, and d as columns of the array. The packed data sets of rows R(0), R(1), R(2), and R(3) of array 500 are each 64 bits wide and comprise four packed words. For one embodiment of the present invention, the four packed data sets are contained within four consecutive registers in a computer's memory and are associated with a 4×4 array of pixels in a video image. In this embodiment, each of the word elements within array 500 represents a 16 bit color value. A transposition is performed in conjunction with a discrete cosine transform algorithm or a fast Fourier transform algorithm. For other embodiments, the packed data sets of an array contain packed data elements which represent other forms of related data such as, for example, consecutive 16 bit samples of audio information.

For numerous descriptions herein, the array being transposed is most likely a sub-array of a much larger array to be transposed. For example, a larger array might be an entire video image stored in a block of memory registers, while a sub-array is only the portion of the image which can be stored in a sub-set of the memory registers, upon which the operations described below can act. It is to be appreciated that, if desired, the larger array can be transposed by performing a serious of transpositions on the smaller sub-arrays, then assigning the transposed sub-arrays back into the appropriate locations within larger array.

As such, in accordance with an embodiment of the present invention, each row of the arrays described below corresponds to an individual memory register containing a packed data set. Therefore, while the memory registers themselves need not be contiguous within the memory block (or even be assigned to consecutive addresses), the rows of the array to which they are associated, R(0), R(1), R(2), etc., are conceptualized as such.

For the embodiment of the present invention shown in FIG. 5, the first step in transposing array 500 is to interleave the low-order, 16 bit word data elements of rows R(0), R(1), R(2), and R(3) using the unpack operation "Unpack Low Word" or "Unpack LW". Temporary result t(0) is generated by performing an Unpack LW operation on packed data sets R(0) and R(1), resulting in packed data set b(1)b(0)a(1)a(0) as shown. Temporary result t(1) is generated by performing an Unpack LW operation on packed data sets R(2) and R(3), resulting in packed data set b(3)b(2)a(3)a(2) as shown. Next, the high-order, 16 bit word data elements of rows R(0), R(1), R(2), and R(3) are interleaved using the unpack operation "Unpack High Word" or "Unpack HW". Temporary result t(2) is generated by performing an Unpack HW operation on packed data sets R(0) and R(1), resulting in packed data set d(1)d(0)c(1)c(0) as shown. Temporary result t(3) is generated by performing an Unpack HW operation on packed data sets R(2) and R(3), resulting in packed data set d(3)d(2)c(3)c(2) as shown.

Once the intermediate results t(0), t(1), t(2), and t(3) have been determined, the next step is to interleave low-order and high-order, 32 bit doubleword data elements of the intermediate results, each doubleword comprising two 16 bit word data elements of the original packed data sets. Interleaving of 32 bit doubleword data elements is accomplished using the unpack operation "Unpack Low Doubleword" or "Unpack LD" and "Unpack High Doubleword" or "Unpack HD". Final result V(0) is generated by performing an Unpack LD operation on packed data sets t(0) and t(1), resulting in packed data set a(3)a(2)a(1)a(0) as shown. Final result V(1) is generated by performing an Unpack HD operation on packed data sets t(0) and t(1), resulting in packed data set b(3)b(2)b(1)b(0) as shown. Final result V(2) is generated by performing an Unpack LD operation on packed data sets t(2) and t(3), resulting in packed data set c(3)c(2)c(1)c(0) as shown. Final result V(3) is generated by performing an Unpack HD operation on packed data sets t(2) and t(3), resulting in packed data set d(3)d(2)d(1)d(0) as shown.

The resultant, transposed array 501 comprises the packed data sets V(0), V(1), V(2), and V(3) as rows of the transposed array. Note that by transposing array 500 in this manner, array 500 is effectively "flipped" about the axis extending from the location of data element a(0), in the upper-right corner of the array, to the location of data element d(3), in the lower-left corner of the array. For example, what was row R(1) of array 500, d(1)c(1)b(1)a(1), becomes column "1" of transposed array 501, and what was column "d" of array 500, d(0)d(1)d(2)d(3), becomes row V(3) of transposed array 501. Also, note that for this embodiment, and for other embodiments described below, the registers may have little endian representation. While a row may be represented as containing data elements in the order d-c-b-a, etc., it is to be understood that a row may also be represented as containing data elements in the order a-b-c-d, etc., and is transposed along the diagonal extending from the upper-right corner (d(0) for the case of a 4×4 matrix) to the lower-left corner (a(0)).

For an alternate embodiment of the present invention, each row of a 4×4 array which is transposed by the method of FIG. 5 is 32 bits wide and comprises four packed bytes. For another embodiment, each row is 128 bits wide and comprises four doublewords. In other embodiments, each row of a 4×4 array transposed by a method in accordance with the present invention is a data set which is any number of bits wide, partitioned to create four data elements of equal size.

For another embodiment of the present invention, the interleaving of data elements performed by the unpack operations is reversed so that the columns of the transposed array contain data elements in the reverse order from the rows of the original array. In this embodiment, the original array is effectively flipped about the axis extending from the upper-left corner of the array to the lower-right corner of the array to produce the transposed array. A transposition in accordance with this embodiment is described in more detail below in conjunction with FIG. 7.

Also, for one embodiment, one or more of the unpack operations are executed in parallel with other unpack operations. So, for example, in an embodiment in which a parallel processor or multi-processor capable of executing two instructions simultaneously is used, the unpack operation used to generate one of the results t(0), t(1), t(2), or t(3) is performed in parallel with the unpack operation used to generate another of results t(0), t(1), t(2), or t(3). Similarly, the unpack operation used to generate one of results V(0), V(1), V(2), or V(3) is performed in parallel with the unpack operation used to generate another of results V(0), V(1), V(2), or V(3). For one embodiment, parallel unpack operations are completed in one clock cycle.

In this manner, array 500 is transposed into array 501 in four steps, two pairs of unpack operations performed in two parallel steps to generate results t(0), t(1), t(2), and t(3), and two pairs of unpack operations performed in two parallel steps to generate results V(0), V(1), V(2), and V(3). Similarly, for an embodiment in which four operations can be performed simultaneously, all four unpack operations are performed in parallel to generate results t(0), t(1), t(2), and t(3) in a first single step, and all four unpack operations are performed in parallel to generate results V(0), V(1), V(2), and V(3) in a second single step. Hence, array 500 is transposed into array 501 in only two steps. Parallel processing of unpack operations in this manner can significantly improve the speed with which the array is transposed.

FIG. 6 shows a method for transposing an array in accordance with another embodiment of the present invention. Array 600 represents the 4×4 matrix 500 of FIG. 5. However, in accordance with the embodiment of FIG. 6, the array is transposed using only unpack word operations, rather than the combination of unpack word and unpack doubleword operations illustrated in FIG. 5. An Unpack LW operation is performed on rows R(0) and R(2) to generate the intermediate, temporary result t(0), comprising the data elements b(2)b(0)a(2)a(0). An Unpack LW operation is also performed on rows R(1) and R(3) to generate the intermediate, temporary result t(1), comprising the data elements b(3)b(1)a(3)a(1). An Unpack LW operation is performed on temporary results t(0) and t(1) to generate the final result V(0), comprising the data elements a(3)a(2)a(1)a(0). Another unpack operation, Unpack HW, is again performed on temporary results t(0) and t(1) to generate the final result V(1), comprising the data elements b(3)b(2)b(1)b(0).

Continuing the transposition of array 600 using unpack operations, an Unpack HW operation is performed on rows R(0) and R(2) to generate the intermediate, temporary result t(2), comprising the data elements d(2)d(0)c(2)c(0). An Unpack HW operation is also performed on rows R(1) and R(3) to generate the intermediate, temporary result t(3) comprising the data elements d(3)d(1)d(3)d(1). An Unpack LW operation is performed on temporary results t(2) and t(3) to generate the final result V(2), comprising the data elements c(3)c(2)c(1)c(0). Another unpack operation, Unpack HW, is again performed on temporary results t(2) and t(3) to generate the final result V(3), comprising the data elements d(3)d(2)d(1)d(0). The resultant, transposed array 601 comprises the packed data sets V(0), V(1), V(2), and V(3), as rows of the transposed array. As described above in conjunction with FIG. 5, in an embodiment in which multiple instructions can be executed in parallel, the entire transposition can be performed in two or four steps, completing in two of four clock cycles respectively.

FIG. 7 shows a method for transposing an array in accordance with another embodiment of the present invention. The array which is to be transposed in accordance with the embodiment shown in FIG. 7 is the 4×2 array comprising column a, a(0)a(1)a(2)a(3), and column b, b(0)b(1)b(2)b(3), of 4×4 array 700, which represents the 4×4 array 500 of FIG. 5. An Unpack LW operation is performed on rows R(0) and R(2) to generate the intermediate, temporary result t(0), comprising the data elements b(0)b(2)a(0)a(2). An Unpack LW operation is also performed on rows R(1) and R(3) to generate the intermediate, temporary result t(1), comprising the data elements b(1)b(3)a(1)a(3). An Unpack LW operation is performed on temporary results t(0) and t(1) to generate the final result V(0), comprising the data elements a(0)a(1)a(2)a(3).

In accordance with the embodiment of FIG. 7, temporary results t(0) and t(1) are shifted to the right so that the high-order data elements in the high-order positions in the upper-half of the registers containing t(0) and t(1) are shifted into the low-order positions in the lower-half of the registers. After results t(0) and t(1) are shifted, another Unpack LW operation is performed on the high-order data elements in the low-order positions in t(0) and t(1) to generate result V(1), comprising the data elements b(0)b(1)b(2)b(3). The transposed array 701 comprises results V(0) and V(1).

This embodiment is useful in applications in which, for example, a processor used in accordance with the present invention does not support unpack high operations, such as Unpack HW. Where only unpack low operations are supported, high-order data elements are unpacked by first shifting these high-order data elements from high-order positions into low-order positions of their respective data sets before unpacking the packed data sets. For another embodiment in which only unpack high operations are supported, low-order data elements are unpacked by shifting the data elements into high-order positions of their respective data sets before unpacking the packed data sets.

Note, however, that this embodiment may be found less efficient to transpose an array due to the extra steps involved in shifting the data elements of the packed data sets. For example, two additional shift operations are associated with each unpack operation in which high-order data elements are to be interleaved in accordance with the embodiment illustrated in FIG. 7. Therefore, in accordance with the embodiments illustrated in FIGS. 5 and 6, eight additional operations would need to be performed to implement the four unpack high operations used to generate results t(2), t(3), V(1), and V(3) using the shifting method of FIG. 7. While the total number of steps may be reduced utilizing parallel processing techniques, as described above, the method of FIG. 7 may never achieve the efficiency associated with "direct" interleaving of high order data elements using the unpack high instruction.

For another embodiment, the unpack low operations along with the shifting operations are performed on the remaining two columns of array 700 to complete the transposition process, if desired, creating a full 4×4 transposed array. Note that the order of data elements in rows V(0) and V(1) in transposed array 701 is the reverse of the order of data elements in rows V(0) and V(1), respectively, of transposed arrays 501 and 601. As discussed above, reversing the order of interleaving data elements, by reversing the sources of the unpack operations, results in this reversal of data element order of the transposed array.

FIG. 8, comprising FIGS. 8A and 8B, shows a method for transposing an array in accordance with another embodiment of the present invention. Array 800 is an 8×8 matrix comprising data sets R(0), R(1), R(2), . . . R(7) as rows of the array, each row containing eight data elements a, b, c, d, e, f, g, and h as columns of the array. The packed data sets of the rows are each 64 bits wide and comprise eight packed bytes. For one embodiment of the present invention, the eight packed data sets are contained within eight consecutive registers in a computer's memory and are associated with an 8×8 array of pixels in a video image. In this embodiment, each of the byte elements within array 800 represents an 8 bit color or gray-scale value. For another embodiment, each byte element represents an 8 bit frequency coefficient in accordance with a fast Fourier transform. For other embodiments, the packed data sets of the array contain packed data elements which represent other forms of related data such as, for example, consecutive 8 bit samples of video or audio signals, and a transposition is performed in conjunction with a discrete cosine transform or inverse transform, or other type of transform.

In accordance with the method shown in FIG. 8, the columns of 8×8 array 800 are transposed into 8×8 array 801. The 8 bit bytes of rows R(0), R(1), R(2), . . . R(8) are interleaved using the unpack operation "Unpack Low Byte" or "Unpack LB". Temporary result t(0) is generated by performing an Unpack LB operation on packed data sets R(0) and R(1), resulting in packed data set d(1)d(0)c(1)c(0)b(1)b(0)a(1)a(0) as shown. Temporary result t(1) is generated by performing an Unpack LB operation on packed data sets R(2) and R(3), resulting in packed data set d(3)d(2)c(3)c(2)b(3)b(2)a(3)a(2) as shown. Temporary result t(2) is generated by performing an Unpack LB operation on packed data sets R(4) and R(5), resulting in packed data set d(5)d(4)c(5)c(4)b(5)b(4)a(5)a(4) as shown. Temporary result t(3) is generated by performing an Unpack LB operation on packed data sets R(6) and R(7), resulting in packed data set d(7)d(6)c(7)c(6)b(7)b(6)a(7)a(6) as shown.

Temporary result t(4) is generated by performing an Unpack HB operation on packed data sets R(0) and R(1), resulting in packed data set h(1)h(0)g(1)g(0)f(1)f(0)e(1)e(0) as shown. Temporary result t(5) is generated by performing an Unpack HB operation on packed data sets R(2) and R(3), resulting in packed data set h(3)h(2)g(3)g(2)f(3)f(2)e(3)e(2) as shown. Temporary result t(6) is generated by performing an Unpack HB operation on packed data sets R(4) and R(5), resulting in packed data set h(5)h(4)g(5)g(4)f(5)f(4)e(5)e(4) as shown. Temporary result t(7) is generated by performing an Unpack HB operation on packed data sets R(6) and R(7), resulting in packed data set h(7)h(6)g(7)g(6)f(7)f(6)e(7)e(6) as shown.

Temporary result u(0) is generated by performing an Unpack LW operation on temporary results t(0) and t(1), resulting in packed data set b(3)b(2)b(1)b(0)a(3)a(2)a(1)a(0) as shown. Temporary result u(1) is generated by performing an Unpack LW operation on packed data sets t(2) and t(3), resulting in packed data set b(7)b(6)b(5)b(4)a(7)a(6)a(5)a(4) as shown. Temporary result u(2) is generated by performing an Unpack HW operation on temporary results t(0) and t(1), resulting in packed data set d(3)d(2)d(1)d(0)c(3)c(2)c(1)c(0) as shown. Temporary result u(3) is generated by performing an Unpack HW operation on packed data sets t(2) and t(3), resulting in packed data set d(7)d(6)d(5)d(4)c(7)c(6)c(5)c(4) as shown.

Temporary result u(4) is generated by performing an Unpack LW operation on temporary results t(4) and t(5), resulting in packed data set f(3)f(2)f(1)f(0)e(3)e(2)e(1)e(0) as shown. Temporary result u(5) is generated by performing an Unpack LW operation on packed data sets t(6) and t(7), resulting in packed data set f(7)f(6)f(5)f(4)e(7)e(6)e(5)e(4) as shown. Temporary result u(6) is generated by performing an Unpack HW operation on temporary results t(4) and t(5), resulting in packed data set h(3)h(2)h(1)h(0)g(3)g(2)g(1)g(0) as shown. Temporary result u(7) is generated by performing an Unpack HW operation on packed data sets t(6) and t(7), resulting in packed data set h(7)h(6)h(5)h(4)g(7)g(6)g(5)g(4) as shown.

Final result V(0) is generated by performing an Unpack LD operation on packed data sets u(0) and u(1), resulting in packed data set a(7)a(6)a(5)a(4)a(3)a(2)a(1)a(0), as shown. Final result V(1) is generated by performing another unpack operation, Unpack HD, on packed data sets u(0) and u(1), resulting in packed data set b(7)b(6)b(5)b(4)b(3)b(2)b(1)b(0), as shown. Final result V(2) is generated by performing an Unpack LD operation on packed data sets u(2) and u(3), resulting in packed data set c(7)c(6)c(5)c(4)c(3)c(2)c(1)c(0), as shown. Final result V(3) is generated by performing another unpack operation, Unpack HD, on packed data sets u(2) and u(3), resulting in packed data set d(7)d(6)d(5)d(4)d(3)d(2)d(1)d(0), as shown.

Final result V(4) is generated by performing an Unpack LD operation on packed data sets u(4) and u(5), resulting in packed data set e(7)e(6)e(5)e(4)e(3)e(2)e(1)e(0), as shown. Final result V(5) is generated by performing another unpack operation, Unpack HD, on packed data sets u(4) and u(5), resulting in packed data set f(7)f(6)f5)f(4)f(3)f(2)f(1)f(0), as shown. Final result V(6) is generated by performing an Unpack LD operation on packed data sets u(6) and u(7), resulting in packed data set g(7)g(6)g(5)g(4)g(3)g(2)g(1)g(0), as shown. Final result V(7) is generated by performing another unpack operation, Unpack HD, on packed data sets u(6) and u(7), resulting in packed data set h(7)h(6)h(5)h(4)h(3)h(2)h(1)h(0), as shown. The transposed array 801 comprises results V(0), V(1), V(2), V(3), V(4), V(5), V(6), and V(7) as shown.

For one embodiment, one or more of the unpack operations are executed in parallel with other unpack operations. So, for example, in an embodiment in which a parallel processor or multi-processor capable of executing two instructions simultaneously is used, the unpack operation used to generate one of results t(0), t(1), t(2), t(3), t(4), t(5), t(6), or t(7) is performed in parallel with the unpack operation used to generate another of results t(0), t(1), t(2), t(3), t(4), t(5), t(6), or t(7) in one step. Also, the unpack operation used to generate one of results u(0), u(1), u(2), u(3), u(4), u(5), u(6), or u(7) is performed in parallel with the unpack operation used to generate another of results u(0), u(1), u(2), u(3), u(4), u(5), u(6), or u(7) in one step. Similarly, the unpack operation used to generate one of results V(0), V(1), V(2), V(3), V(4), V(5), V(6), or V(7) is performed in parallel with the unpack operation used to generate another of results V(0), V(1), V(2), V(3), V(4), V(5), V(6), or V(7) in one step. For one embodiment, each step is completed in one clock cycle.

In this manner, array 800 is transposed into array 801 in 12 steps; four pairs of unpack operations performed in four parallel steps to generate results t(0), t(1), t(2), t(3), t(4), t(5), t(6), and t(7); four pairs of unpack operations performed in four parallel steps to generate results u(0), u(1), u(2), u(3), u(4), u(5), u(6), and u(7); and four pairs of unpack operations performed in four parallel steps to generate results V(0), V(1), V(2), V(3), V(4), V(5), V(6), and V(7). Similarly, for an embodiment in which four operations can be performed simultaneously, four unpack operations are performed in parallel in a single step, allowing array 800 to be transposed into array 801 in 6 steps. Also, for an embodiment in which eight operations can be performed simultaneously, all eight unpack operations are performed in parallel to generate results t, u, and V, each in a single step, allowing array 800 to be transposed into array 801 in only three steps. Parallel processing of unpack operations in this manner can significantly improve the speed with which the array is transposed.

For an alternate embodiment, only unpack high or unpack low operations are used, in conjunction with a shift operation, to perform the transposition, as illustrated in FIG. 7. However, as noted above, the efficiency with which the array is transposed is reduced through the use of shift operations, versus the use of both unpack high and unpack low operations.

For another embodiment, only unpack byte operations are used by interleaving non-consecutive rows of packed data sets in the array to perform the transposition in a manner similar to that illustrated in FIG. 6. For this embodiment, bytes from row R(0) are interleaved with row R(4) using an unpack byte operation to generate a first result. Then, an unpack byte operation is performed between this first result and the result of an unpack byte operation performed on rows R(2) and R(6) to generate a second result. Bytes from row R(1) are interleaved with row R(5) using an unpack byte operation to generate a third result. Then, an unpack byte operation is performed between this third result and the result of an unpack byte operation performed on rows R(3) and R(7) to generate a fourth result. Then, another unpack byte operation is performed between the second result and the fourth result to generate a final packed data set row of the transposed array. Unpacking of rows of the original array continues in this manner until the entire array, or the desired portion of the array, is transposed.

For another embodiment, only unpack byte and unpack doubleword operations are used by effectively splitting the 8×8 array into two arrays, each comprising four rows, interleaving each of the four rows in a manner similar to that illustrated in FIG. 6, and combining the results using an unpack doubleword. For example, bytes from row R(0) are interleaved with row R(2) using an unpack byte operation to generate a first result. Then, an unpack byte operation is performed between this first result and the result of an unpack byte operation performed on rows R(1) and R(3) to generate a second result. Bytes from row R(4) are interleaved with row R(6) using an unpack byte operation to generate a third result. Then, an unpack byte operation is performed between this third result and the result of an unpack byte operation performed on rows R(5) and R(7) to generate a fourth result. Then, an unpack doubleword operation is performed between the second result and the fourth result to generate a final packed data set row of the transposed array. Unpacking of rows of the original array continues in this manner until the entire array, or the desired portion of the array, is transposed.

For an alternate embodiment of the present invention, each row of an 8×8 array which is transposed by the method of FIG. 8 is 32 bits wide and comprises eight packed 4 bit data elements. For another embodiment, each row is 128 bits wide and comprises eight words. For other embodiments, each row of an 8×8 array transposed by a method in accordance with the present invention is a data set which is any number of bits wide, partitioned to create eight data elements of equal size. Moreover, it is to be appreciated that various combinations of the basic row selection and interleaving techniques, described above in accordance with the exemplary embodiments of FIGS. 5, 6, 7, and 8, may be used to transpose arrays comprising rows and data elements having virtually any length.

Figure 9:
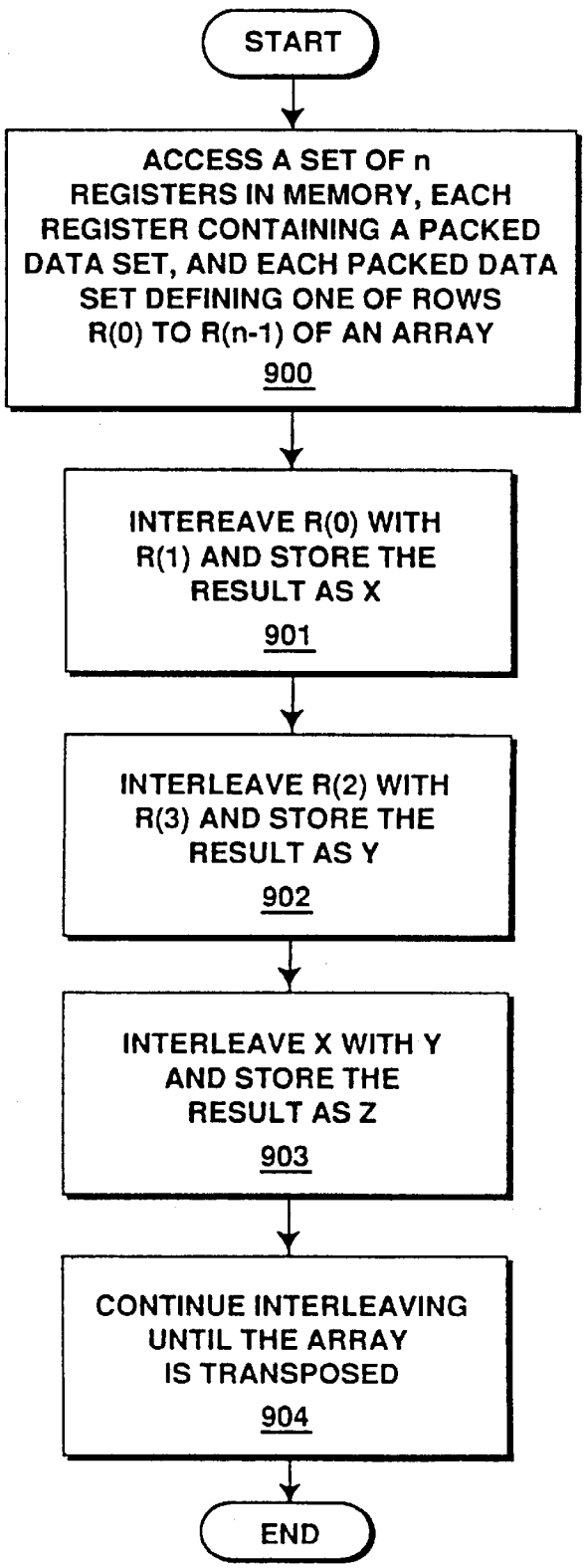
FIG. 9 is a flow chart of the steps taken to transpose an array in accordance with one embodiment of the present invention.

FIG. 9 is a flow chart of the steps taken to transpose an array in accordance with one embodiment of the present invention. At step 900, an array of data is accessed in the memory of a computer system by identifying a set of n registers in memory, each register containing a packed data set, and each packed data set defining one of rows R(0) to R(n−1) of the array. At step 901, data elements in a first row of the array, R(0), are interleaved with data elements in a second row of the array R(1) by performing an unpack operation, and the result of this unpack operation is stored as data set X. At step 902, a third row of the array, R(2), is interleaved with a fourth row of the array R(3) in the same manner, using an unpack operation, and the result of this unpack operation is stored as data set Y.

Note that in accordance with the nomenclature used herein, unless otherwise indicated, the terms "first row", "second row", "third row", "fourth row", etc. are used as place-holder variables meant to distinguish one row from another in an array rather than consecutive row numbers of the array. For example, a second row does not necessarily follow a first row consecutively in an array, and a fourth row may come between a second row and a third row. On the other hand, the terms R(0), R(1), R(2), R(4), etc. are used to indicate the actual, consecutive row numbers of an array to be transposed, so that, for example, R(1) always follows R(0) consecutively, and R(2) is always located between R(3) and R(4) in the array.

For one embodiment, the unpack operations of steps 901 and 902 unpack data elements of an equal size, $2^m$ bits. The unpack operations are either high or low, and the size of the data elements unpacked are any of a number of bits wide. At step 903, data sets X and Y are interleaved by performing an unpack operation on data sets X and Y to generate data set Z. For one embodiment, the unpack operation of step 903 unpacks data elements which are twice the size of the data elements unpacked at steps 901 and 902, or $2^{m+1}$ bits. As indicated by step 904, interleaving continues until the array, or some desired portion thereof, is transposed. In this manner, arrays of any size are transposed using the proper sequence of unpack operations to interleave data sets.

Figure 10:
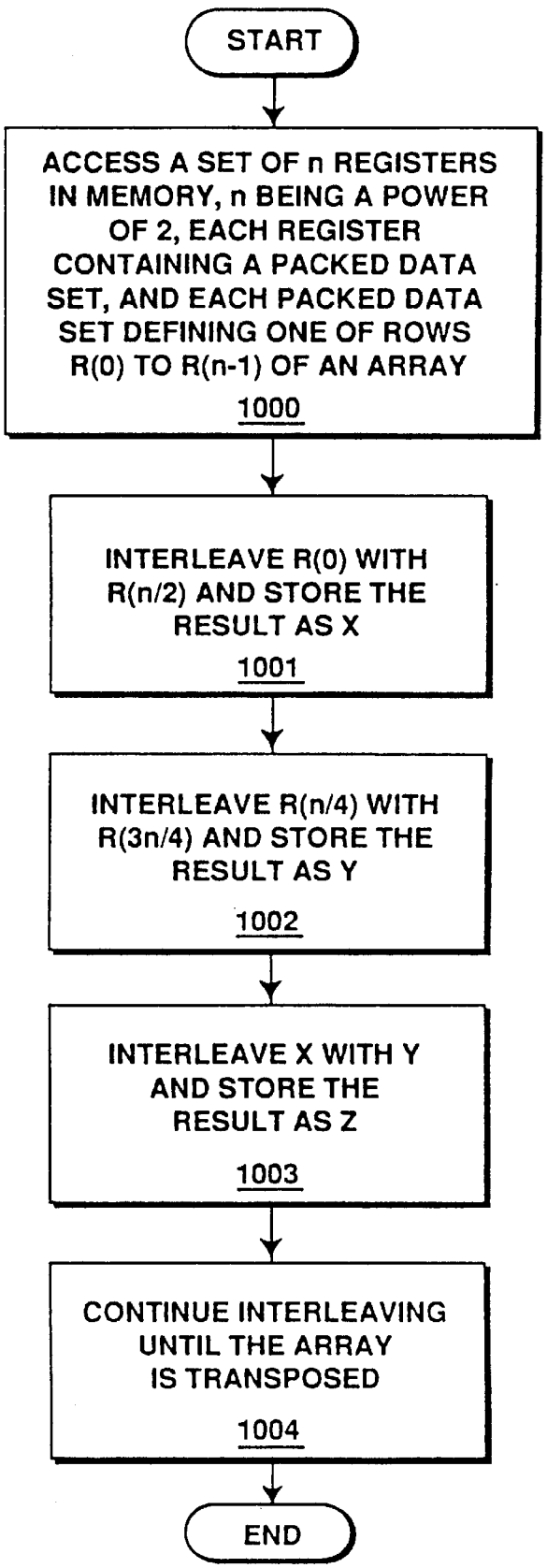
FIG. 10 is a flow chart of the steps taken to transpose an array in accordance with another embodiment of the present invention.

FIG. 10 is a flow chart of the steps taken to transpose an array in accordance with another embodiment of the present invention. At step 1000, an array of data is accessed in the memory of a computer system by identifying a set of n registers, where n is a power of 2, each register containing a packed data set, and each packed data set defining one of rows R(0) to R(n−1) of the array. At step 1001, a first row of the array, R(0), is interleaved with a second row of the array, R(n/2), by performing an unpack operation, and the result of this unpack operation is stored as data set X. At step 902, a third row of the array, R(n/4), is interleaved with a fourth row of the array, R(3n/4), by performing an unpack operation, and the result of this unpack operation is stored as data set Y. For example, for a 4×4 array, the first row is R(0) while the second row is R(2) of the array, according to step 1001. For an 8×8 array, the third row is R(2) while the fourth row is R(6) of the array, according to step 1002. For a 16×4 array, the first row is R(0) while the second row is R(8) of the array, according to step 1001.

For one embodiment, the unpack operations of steps 1001 and 1002 unpack data elements of an equal size, $2^m$ bits. The unpack operations are either high or low, and the size of the data elements unpacked are any of a number of bits wide. At step 1003, data sets X and Y are interleaved by an unpack operation to generate data set Z. For one embodiment, the unpack operation of step 1003 unpacks data elements which are equal to the size of the data elements unpacked at steps 1001 and 1002, $2^m$ bits. This embodiment is useful for situations in which the processor of the computer system performing the unpack operations does not support unpack instructions for unpacking data elements of, for example, $2^{m+1}$ bits wide. As indicated by step 1004, unpacking continues until the array, or some desired portion thereof, is transposed. In this manner, arrays of any size are transposed using the proper sequence of unpack operations to interleave data sets. In another embodiment of the present invention, an array is transposed using the proper sequence of unpack operations in accordance with the methods shown in FIGS. 9, 10, or a mixture of the two.

Figure 11:
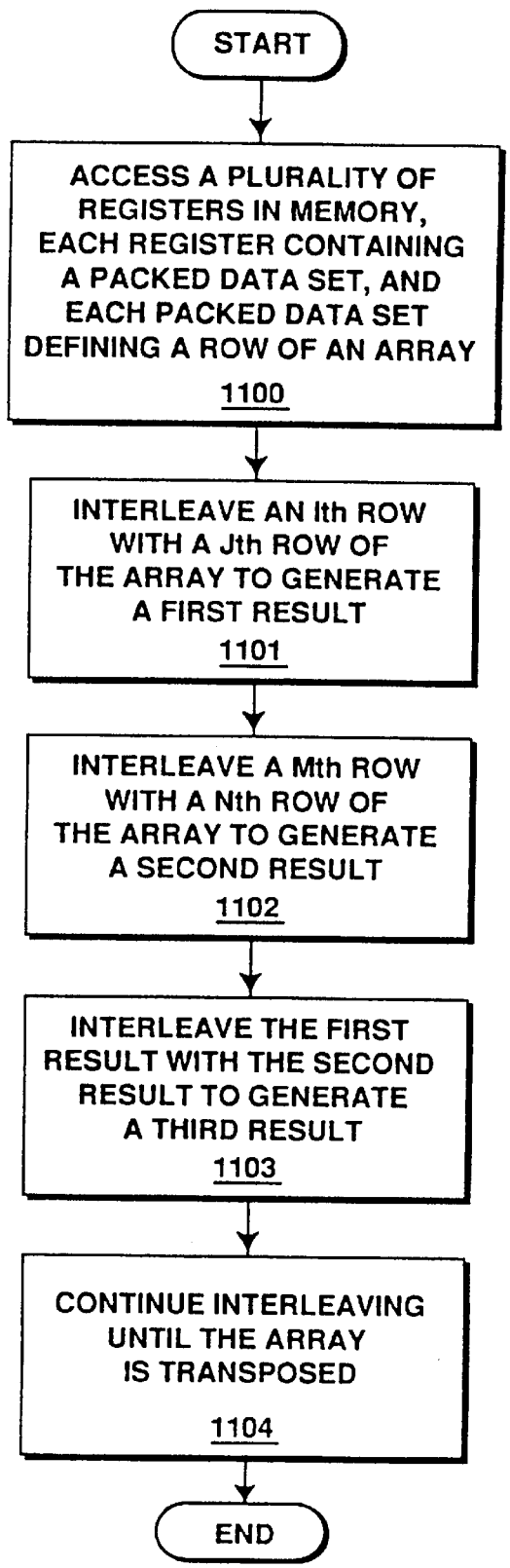
FIG. 11 is a flow chart of the steps taken to transpose an array in accordance with another embodiment of the present invention.

FIG. 11 is a flow chart of steps taken to transpose an array in accordance with embodiments of the present invention. At step 1100, an array is accessed in the memory of a computer system. According to one embodiment, the array has n rows, R(0) to R(n−1), where n is a power of 2, such as $2^z$, where z is an integer such as 1, 2, 3, 4, etc. At step 1101, a first row (the Ith row) of the array is interleaved with a second row (the Jth row) of the array to generate a first result. For one embodiment, the first row is R(0) and the second row is a power of 2, such as $2^x$, away from R(0) in the array, R($2^x$), where x is also an integer such as 0, 1, 2, 3, etc. At step 1102, a third row of the array (the Mth row) is interleaved with a fourth row of the array (the Nth row) to generate a second result. For one embodiment, the third row is a power of 2, such as $2^y$, away from R(0) in the array, R($2^y$), where y is also an integer such as 0, 1, 2, 3, etc. The fourth row is the same distance from the third row, R($2^y$), as the second row, R($2^x$), is from the first row, R(0). Therefore, the fourth row is at location R($2^x+2^y$) in the array.

For an embodiment of the present invention in which a 2×2 array is transposed, only steps 1101 and 1102 need be executed, wherein one unpack operation is low while the other is high. For another embodiment in which a 2×2 array is transposed, two unpack low or two unpack high operations are executed in conjunction with two shift operations to properly shift the packed data elements into the correct format for unpacking.

At step 1103, the first result is interleaved with the second result to generate a third result. For an embodiment in which a 4×4 array is transposed, this third result is a row in the final, transposed array. For another embodiment in which an 8×8 array is transposed, this third result is the source for a subsequent unpack operation which generates a fourth result, the fourth result being a row in the final, transposed array. For another embodiment in which a 16×16 array is transposed, this fourth result is the source for a subsequent unpack operation which generates a fifth result, the fifth result being a row in the final, transposed array. For another embodiment in which a 32×32 array is transposed, this fifth result is the source for a subsequent unpack operation which generates a sixth result, the sixth result being a row in the final, transposed array. And so forth.

For one embodiment in which a 4×4 array is transposed, z=2, x=0, and y=1, so the Ith row is R(0), the Jth row is R(1), the Mth row is R(2), and the Nth row is R(3). For another embodiment, z=2, x=1, and y=0, so the Ith row is R(0), the Jth row is R(2), the Mth row is R(1), and the Nth row is R(3). For one embodiment in which an 8×8 array is transposed, z=3, x=0, and y=2, so the Ith row is R(0), the Jth row is R(1), the Mth row is R(4), and the Nth row is R(5). For another embodiment, z=3, x=1, and y=2, so the Ith row is R(0), the Jth row is R(2), the Mth row is R(4), and the Nth row is R(6). For another embodiment, z=3, x=2, and y=1, so the Ith row is R(0), the Jth row is R(4), the Mth row is R(2), and the Nth row is R(6). For another embodiment, z=3, x=2, and y=0, so the Ith row is R(0), the Jth row is R(4), the Mth row is R(1), and the Nth row is R(5).

Other combinations and values for x, y, and z can be used in conjunction with FIG. 11 to determine the initial rows to interleave to transpose an array having 8, 16, 32, or other number of rows. As indicated by step 1104, interleaving continues until the array, or some desired portion thereof, is transposed.

FIGS. 12A and 12B show an application of array transposition in accordance with an embodiment of the present invention in which a video signal is manipulated by, for example, compressing the signal before storing, displaying, or transmitting its associated data. Data associated with a video or audio signal is data which results from the digitizing, compressing, or other manipulation of a video or audio signal, and from which a video or audio signal can be reconstructed. For purposes of the discussion herein, the use of the terms "video signal" or "audio signal" are intended to indicate the data associated with these signals.

Camera 1200 transmits a video signal to a receiving stage 1202 within a first computer system 1220 to which the camera is coupled. For an embodiment in which the present invention is implemented in conjunction with a video conferencing application, the image received at receiving stage 1202 is primarily an image of the operator of the first computer system 1220 in communication with an operator of a remote second computer system 1221. For an alternate embodiment in which the computer system operator desires to, for example, edit, store, or otherwise manipulate motion-picture or still-motion video images, the output of a VCR, other video capture device, another computer system, a CD-ROM, or other laser disk is fed to the receiving stage of the computer system.

At receiving stage 1202, the data associated with the video signal from camera 1200 is stored in the computer system memory to which the camera is coupled (either directly or via one or more processing or control units). This stored data represents, for example, digital samples of the video signal transmitted by the camera. For one embodiment, the data is stored in a first portion of memory, then transferred into a second portion of memory via the central processing unit of the computer system. This data is organized such that each of a plurality of registers within the computer system memory contains a packed data set wherein each data element of the packed data set represents an associated pixel of a frame of the video image. For example, for one embodiment a 64 bit register contains 8 packed bytes, each byte being associated with a different pixel, wherein the value of each byte represents one of 256 possible colors of its associated pixel. A larger palette of colors may be used in an embodiment in which the 64 bit register contains 4 words, or a 128 bit register contains 8 words, each word being associated with a different pixel.

For one embodiment, two or more separate data elements are used to define an individual pixel. For example, in a red-green-blue (RGB) encoding scheme, one data element in a first packed data set defines the R value of a pixel; another data element in a second packed data set defines the G value of the same pixel; and a third data element in a third packed data set defines the B value of the same pixel. For an embodiment in which the Joint Photographers Expert Group (JPEG) standard or the Moving Pictures Experts Group (MPEG) standard is implemented, the encoding scheme separates the luminance of a pixel from the chrominance of that pixel, storing the data elements representing each of these in separate packed data sets. The luminance of a pixel represents the grey scale, or brightness, of the pixel while the chrominance represents the color of the pixel.

The human eye is more tolerant to errors in color than errors in brightness. By separating the data elements which represent pixel luminance from the data elements which represent pixel chrominance, the data elements representing luminance can be made larger than the data elements representing pixel chrominance, thereby ensuring higher precision of brightness for each pixel while economizing on the space used to store color information. For example, for one embodiment, the length of data elements used to represent luminance is twice the length of data elements used to represent chrominance. Another advantage to separately storing luminance and chrominance data elements is that different compression algorithms can be used to compress the luminance and chrominance data, optimizing each algorithm for the type of data to be compressed.

Note that in accordance with one embodiment of the present invention, digital sampling of the video signal is performed. Sampling of the video signal may be performed by an analog to digital converter either within receiving stage 1202 or within camera 1200. In the same manner, reconverting a sampled signal back into an analog signal may be performed by a digital to analog converter. Analog to digital and digital to analog converters can be implemented by dedicated hardware, such as digital signal processors, or by software running on a general purpose processor. However, in order to avoid unnecessarily obscuring the present invention, waveform sampling is not described in detail here, and in the interest of clarity, all signals are illustrated in FIG. 12B as continuous waveforms.

Once the video signal has been stored as data in the computer system memory, the data is manipulated at compression stage 1203, which may include compressing the data into a smaller memory space. By occupying a smaller memory space, the video signal is more easily modified, stored, or transmitted because there is less data to modify, store, or transmit, requiring less processing power and system resources. As shown in FIG. 12B, the video signal 1212, stored in memory registers of the computer system, is directed to compression stage 1203. In the spatial domain, video signal 1212 is represented by a waveform in which the amplitude of the signal is indicated by vertical displacement while time or space is indicated by horizontal displacement.

For many compression methods it is desirable to transform a signal from the spatial domain to another domain, such as the frequency domain, before analyzing or modifying the signal. After video signal 1212 is received at compression stage 1203, the signal is transformed from the spatial domain to the frequency domain. In the frequency domain, the amplitude of a particular frequency component (e.g. a sine or cosine wave) of the original signal is indicated by vertical displacement while the frequency of each frequency component of the original signal is indicated by horizontal displacement. The video waveform 1212 is illustrated in the frequency domain at step 1213 within compression stage 1203.

Efficient transformation of a signal from the spatial to the frequency domain involves transposing the array containing the data elements representing the signal. For example, in accordance with some JPEG, MPEG, and H.261 standards, square subregions of the video image, generally an 8×8 array of pixels, are transformed from the spatial domain to the frequency domain using a discrete cosine transform function. This 8×8 array of pixels corresponds to eight memory registers, each containing packed data sets of eight data elements, each data element corresponding to the value (e.g. color, brightness, etc.) of its associated pixel in the 8×8 array. To efficiently transform this array of data using the discrete cosine transform function, the array is transposed using one of the transposition techniques described above. For example, FIGS. 8A and 8B illustrate an efficient 8×8 array transposition method. For an alternate embodiment, other array sizes, such as 4×4 or 16×16, are selected as the subregions of the video image to be processed with a discrete cosine transform. For another embodiment, other transform functions are implemented such as, for example, a Fourier transform, a fast Fourier transform, a fast Hartley transform, or a wavelet transform.

Once transformed into the frequency domain, individual frequency components of the signal can be selectively analyzed, attenuated, amplified, or discarded. Filtering is a technique in which certain frequency components of a signal are modified. By selecting an appropriate filter function, many of which are well known, which discards certain frequency components without significantly degrading the appearance of the video image, the video signal is thereby compressed because there are fewer frequency components which define the video image. Filtering of frequency components of the video signal in this manner is implemented at step 1214 within compression stage 1203.

Each frequency component of the waveform is multiplied by an associated coefficient of a low-pass filter function, or, where the associated coefficient is 0, the frequency component is simply not calculated as part of the transform function. As illustrated in FIG. 12B, a low-pass filter eliminates or attenuates higher frequency components of the waveform, allowing lower frequency components to pass through. Higher frequency components are frequencies above a predetermined limit (referred to as the "cutoff frequency" in some applications), while lower frequency components are frequencies below this predetermined limit.

Note that frequency components of a waveform can be manipulated in the frequency domain using other techniques in accordance with other embodiments of the present invention. For one embodiment, an audio waveform transmitted by microphone 1201 is analyzed and manipulated in a similar manner by computer system 1220. For example, upper harmonic analyses of audio waveforms in the frequency domain are conducted in accordance with voice recognition applications. As another example, the harmonic spectrum of audio waveforms are modulated over time to imitate the sounds of voices, sound effects, or musical instruments. In conjunction with sound transmission or storage applications, the audio waveform is compressed by filtering techniques.

Video images can be similarly manipulated in the frequency domain to do more than merely compress the video data. For example, for one embodiment of the present invention, a high-pass filter is applied to a video signal in an edge detection technique. A high-pass filter eliminates or attenuates lower frequency components of the signal, allowing higher frequency components to pass through. Because sharp, high-contrast edges of a video image generally correspond to high frequency components of the associated video signal, a high-pass filter will isolate these edges. This technique may be found useful in motion and image detection and recognition applications. Also, this technique may be found to have applications in predictive vector quantization compression in which the motion of boundaries in consecutive frames of a moving-picture video signal are tracked and predicted to generate successive images.

For one embodiment of the present invention, after the video signal is filtered, the signal is reconverted back into the spatial domain by applying an inverse transform to the data. Alternatively, the signal remains in the frequency domain and is transformed back into the spatial domain during the decompression stage, as described below. Turning back to FIG. 12B, note that the high frequency components have been removed from signal 1212 at step 1214. Removal of these high frequency components from the original video signal does not significantly degrade picture quality. In general, the more a signal is compressed, the greater the loss of image fidelity. Because the human eye is more sensitive to errors in luminance than in chrominance, as stated above, the chrominance portion of the video signal is more highly compressed than the luminance portion.

In addition, in accordance with some JPEG, MPEG, and other video compression methods, differing degrees of compression may be applied to different regions of a video image to gain more compression in those regions requiring less image detail, and less compression in those regions requiring more detail. For an embodiment in which image quality is not of the essence, such as, for example, in a video conferencing application using, for example, an H.261 compression algorithm, high compression with lower frame rates is appropriate. High compression is appropriate because a user generally need only be able to discern the face of the speaker, without intricate detail. Lower frame rates are appropriate because there is likely to be little movement of objects in the video image. One way of achieving higher compression is to simply narrow the low-pass filter function applied to the video signal, thereby removing more higher frequency components.

Additional compression is achieved by truncating the precision of the data and then using a coding scheme to store repetitious terms in an efficient manner. In accordance with one MPEG standard, additional compression is achieved by matching similar arrays of pixels in successive frames, and encoding only the differences or interpolations between frames. By compressing the video signal in this manner, the signal will occupy a smaller amount of space in memory. After compression, the signal is stored, displayed, and/or transmitted in the spatial or frequency domain at step. For example, in accordance with the embodiment illustrated in FIG. 12A, after the video signal is compressed in compression stage 1203, the signal enters transmission stage 1204 which transmits the compressed video signal to the receiving stage 1207 of a second computer system 1221. Because the video signal is compressed, the bandwidth required to transmit the signal from transmission stage 1204 to receiving stage 1207 is greatly reduced, permitting, for example, phone lines to be used for the transmission. For one embodiment of the present invention, in addition to transmitting the video signal, the video signal is encrypted at transmission stage 1204.

Upon receiving the compressed video signal at receiving stage 1207, the data associated with the signal is loaded into computer system memory. In addition, if the video signal is encrypted, it is decrypted here. At decompression stage 1208, the signal is decompressed by a method including, for example, applying an inverse transform to the data to translate the signal back into the spatial domain. This assumes the signal has been transmitted in a compressed format in the frequency domain from computer system 1220. For an embodiment in which the compressed video signal is transmitted in the spatial domain, application of an inverse transform during the decompression stage may not be necessary. However, decompression of an audio or video signal may be more easily accomplished in the frequency domain, requiring a spatial domain signal received by decompression stage 1208 to be transformed into the frequency domain for decompression, then back into the spatial domain for display.

For many embodiments of the present invention in which either transformation, inverse transformation, or both are required for decompression of a video signal, transposing the array comprising the memory register rows and packed data element columns associated with the video signal is an important step for improving the efficiency of the decompression. This transposition is accomplished using one of the array transposition techniques described above.

Once decompressed, the signal is transferred to display stage 1209, which may comprise a video RAM (VRAM) array, and the image is displayed on display device 1211. Using this technique, a user at computer system 1220 can transmit a video image to computer system 1221 for viewing at the second computer terminal. In addition, audio information gathered by microphone 1201 can be compressed and transmitted by computer system 1220 to computer system 1221, with playback available from speakers 1210. Similarly, computer system 1221 may have similar video and audio transmission capabilities (not shown), allowing display and audio playback on display device 1206 and speakers 1205, respectively, of computer system 1220. In this manner, applications such as video conferencing are enabled.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of manipulating data elements in transposing an array of n rows, R(0) to R(n−1), each row comprising a plurality of data elements, the method comprising the computer-implemented steps of:

interleaving a plurality of data elements from a first row with a plurality of data elements from a second row to generate a first result, the data elements from the first and second rows representing signals generated by an input device coupled to the computer;

interleaving a plurality of data elements from a third row with a plurality of data elements from a fourth row to generate a second result, the data elements from the third and fourth rows representing signals generated by the input device; and interleaving a plurality of data elements from the first result with a plurality of data elements from the second result to generate a third result.

2. The method of claim 1, further comprising the steps of:

shifting a plurality of high-order data elements from high-order positions in the first result into low-order positions in the first result;

shifting a plurality of high-order data elements from high-order positions in the second result into low-order positions in the second result; and interleaving a plurality of data elements from low-order positions in the first result with a plurality of data elements from low-order positions in the second result to generate a fourth result, the third result comprising a plurality of low-order data elements from the first and second results.

3. The method of claim 1, further comprising the step of interleaving a plurality of high-order data elements from the first result with a plurality of high-order data elements from the second result to generate a fourth result, the third result comprising a plurality of low-order data elements from the first and second results.

4. The method of claim 3, further comprising the steps of:

interleaving a plurality of high-order data elements from the first row with a plurality of high-order data elements from the second row to generate a fifth result, the first result comprising a plurality of low-order data elements from the first and second rows;

interleaving a plurality of high-order data elements from the third row with a plurality of high-order data elements from the fourth row to generate a sixth result, the second result comprising a plurality of low-order data elements from the third and fourth rows;

interleaving a plurality of low-order data elements from the fifth result with a plurality of low-order data elements from the sixth result to generate a seventh result; and interleaving a plurality of high-order data elements from the fifth result with a plurality of high-order data elements from the sixth result to generate an eighth result.

5. The method of claim 4, wherein the first row is R(0), the second row is R(1), the third row is R(2), and the fourth row is R(3) of the array.

6. The method of claim 4, wherein the first row is R(0), the second row is R(n/2), the third row is R(n/4), and the fourth row is R(3n/4) of the array.

7. The method of claim 4, wherein n=4, and rows of a transposed array comprise the third, fourth, seventh, and eighth results.

8. The method of claim 5, wherein n=4, and rows of a transposed array comprise the third, fourth, seventh, and eighth results.

9. The method of claim 1, wherein the first and second results are generated in parallel in a first step.

10. The method of claim 3, wherein the first and second results are generated in parallel in a first step, and the third and fourth results are generated in parallel in a second step.

11. The method of claim 4, wherein the first, second, fifth, and sixth results are generated in parallel in a first step, and the third, fourth, seventh, and eighth results are generated in parallel in a second step.

12. The method of claim 4, wherein n=4, and each row is 64 bits wide comprising four packed words.

13. The method of claim 4, wherein n=8, and each row is 64 bits wide comprising eight packed bytes.

14. The method of claim 4, wherein n=8, and each row is 128 bits wide comprising eight packed words.

15. A method of manipulating data elements in transposing an array of $2^z$ rows, $R(0)$ to $R(2^z-1)$, of packed data sets comprising a plurality of data elements stored in a computer system memory, the method comprising the computer-implemented steps of:

interleaving a plurality of low-order data elements from row $R(0)$ with a plurality of low-order data elements from row $R(2^x)$, to generate a first result, the low-order data elements from the rows $R(0)$ and $R(2^x)$ representing signals generated by an input device coupled to the computer;

interleaving a plurality of low-order data elements from row $R(2^y)$ with a plurality of low-order data elements from row $R(2^x+2^y)$, to generate a second result, the low-order data elements from the rows $R(2^y)$ and $R(2^x+2^y)$ representing signals generated by the input device;

interleaving a plurality of low-order data elements from the first result with a plurality of low-order data elements from the second result to generate a third result;

interleaving a plurality of high-order data elements from the first result with a plurality of high-order data elements from the second result to generate a fourth result;

interleaving a plurality of high-order data elements from row $R(0)$ with a plurality of high-order data elements from row $R(2^x)$, to generate a fifth result, the high-order data elements from the rows $R(0)$ and $R(2^x)$ representing signals generated by an input device coupled to the computer;

interleaving a plurality of high-order data elements from row $R(2^y)$ with a plurality of high-order data elements from row $R(2^x+2^y)$, to generate a sixth result, the high-order data elements from the rows $R(2^y)$ and $R(2^x+2^y)$ representing signals generated by the input device;

interleaving a plurality of low-order data elements from the fifth result with a plurality of low-order data elements from the sixth result to generate a seventh result; and interleaving a plurality of high-order data elements from the fifth result with a plurality of high-order data elements from the sixth result to generate an eighth result, wherein x, y, and z are all integers.

16. The method of claim 15, further comprising the steps of shifting high-order data elements from high-order positions to low-order positions before generating the fourth, fifth, sixth, and eighth results.

17. The method of claim 15, wherein x=0, y=1, and the first, second, fifth, and sixth results are generated by interleaving data elements of a first size, and the third, fourth, seventh, and eighth results are generated by interleaving data elements of a second size, the second size being twice the first size.

18. The method of claim 15, wherein x=z−1, y=z−2, and the first, second, third, fourth, fifth, sixth, seventh, and eighth results are generated by interleaving data elements of an equal size.

19. The method of claim 17, wherein z=2, and rows of a transposed array comprise the third, fourth, seventh, and eighth results.

20. The method of claim 15, wherein the first, second, fifth, and sixth results are generated in parallel in a first step, and the third, fourth, seventh, and eighth results are generated in parallel in a second step.

21. A method of manipulating data elements in transposing an array of n rows, $R(0)$ to $R(n-1)$, each row comprising a plurality of data elements, a, b, c, and d, the data elements representing a signal generated by an input device, the method comprising the computer-implemented steps of:

performing a first unpack operation on rows $R(0)$ and $R(1)$ to generate a first result, wherein row $R(0)$ comprises $d(0)c(0)b(0)a(0)$, row $R(1)$ comprises $d(1)c(1)b(1)a(1)$, and the first result comprises $b(1)b(0)a(1)a(0)$;

performing a second unpack operation on rows $R(2)$ and $R(3)$ to generate a second result, wherein row $R(2)$ comprises $d(2)c(2)b(2)a(2)$, row $R(3)$ comprises $d(3)c(3)b(3)a(3)$, and the second result comprises $b(3)b(2)a(3)a(2)$; and tvp 58154212.001 v performing a third unpack operation on the first result and the second result to generate a third result, the third result comprising $a(3)a(2)a(1)a(0)$.

22. The method of claim 21, wherein the first and second unpack operations are performed in parallel in a first step.

23. A method of manipulating data elements in transposing an array of n rows, $R(0)$ to $R(n-1)$, each row comprising a plurality of data elements, a, b, c, and d, the data elements representing a signal generated by an input device, the method comprising the computer-implemented steps of:

performing a first unpack operation on rows $R(0)$ and $R(n/2)$ to generate a first result, wherein row $R(0)$ comprises $d(0)c(0)b(0)a(0)$, row $R(n/2)$ comprises $d(n/2)c(n/2)b(n/2)a(n/2)$, and the first result comprises $b(n/2)b(0)a(n/2)a(0)$;

performing a second unpack operation on rows $R(n/4)$ and $R(3n/4)$ to generate a second result, wherein row $R(n/4)$ comprises $d(n/4)c(n/4)b(n/4)a(n/4)$, row $R(3n/4)$ comprises $d(3n/4)c(3n/4)b(3n/4)a(3n/4)$, and the second result comprises $b(3n/4)b(n/4)a(3n/4)a(n/4)$; and performing a third unpack operation on the first result and the second result to generate a third result, the third result comprising $a(3n/4)a(n/2)a(n/4)a(0)$.

24. The method of claim 23, wherein the first and second unpack operations are performed in parallel in a first step.

25. A machine-readable medium having stored thereon data representing sequences of instructions which, when executed by a processor, cause the processor to perform the steps of:

interleaving a plurality of data elements from a first row with a plurality of data elements from a second row of an array of n rows, $R(0)$ to $R(n-1)$, of packed data sets stored in a computer system memory, to generate a first result, the data elements from the first and second rows representing signals generated by an input device coupled to the processor;

interleaving a plurality of data elements from a third row with a plurality of data elements from a fourth row to generate a second result the data elements from the third and fourth rows representing signals generated by the input device; and interleaving a plurality of data elements from the first result with a plurality of data elements from the second result to generate a third result.

26. The medium of claim 25, wherein the third result comprises a plurality of low-order data elements from the first and second results, and the sequences of instructions cause the processor to further perform the step of interleaving a plurality of high-order data elements from the first result with a plurality of high-order data elements from the second result to generate a fourth result.

27. The medium of claim 26, wherein the sequences of instructions cause the processor to further perform the steps of:
- interleaving a plurality of high-order data elements from the first row with a plurality of high-order data elements from the second row to generate a fifth result, the first result comprising a plurality of low-order data elements from the first and second rows;
- interleaving a plurality of high-order data elements from the third row with a plurality of high-order data elements from the fourth row to generate a sixth result, the second result comprising a plurality of low-order data elements from the third and fourth rows;
- interleaving a plurality of low-order data elements from the fifth result with a plurality of low-order data elements from the sixth result to generate a seventh result; and
- interleaving a plurality of high-order data elements from the fifth result with a plurality of high-order data elements from the sixth result to generate an eighth result.

28. The medium of claim 25, wherein the first row is R(0), the second row is R(1), the third row is R(2), the fourth row is R(3), and the first and second results are generated by interleaving data elements of a first size, and the third result is generated by interleaving data elements of a second size, the second size being twice the first size.

29. The medium of claim 25, wherein the first row is R(0), the second row is R(n/2), the third row is R(n/4), the fourth row is R(3n/4), and the first, second, and third results are generated by interleaving data elements of an equal size.

30. The medium of claim 27, wherein n=4, and a transposed array comprises the third, fourth, seventh, and eighth results.

31. The medium of claim 25, wherein the first and second results are generated in parallel in a first step.

32. The medium of claim 26, wherein the first and second results are generated in parallel in a first step, and the third and fourth results are generated in parallel in a second step.

33. The medium of claim 27, wherein the first, second, fifth, and sixth results are generated in parallel in a first step, and the third, fourth, seventh, and eighth results are generated in parallel in a second step.

34. The medium of claim 25, wherein each row is 64 bits wide and comprises eight packed bytes.

35. The medium of claim 26, wherein each row is 128 bits wide and comprises eight packed words.

36. The medium of claim 27, wherein the medium is a CD-ROM.

37. The medium of claim 27, wherein the medium is a hard drive.

* * * * *